US012638937B2

(12) United States Patent
Koike

(10) Patent No.: US 12,638,937 B2
(45) Date of Patent: May 26, 2026

(54) SENSOR CONTROLLER, ELECTRONIC DEVICE, AND CONTROL METHOD OF SENSOR CONTROLLER THAT SUPPLIES INTERMEDIATE POTENTIAL BETWEEN FIRST POTENTIAL AND SECOND POTENTIAL TO OUTPUT SIGNAL LINES

(71) Applicant: Wacom Co., Ltd., Saitama (JP)

(72) Inventor: Takeshi Koike, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/587,672

(22) Filed: Feb. 26, 2024

(65) Prior Publication Data

US 2024/0220046 A1 Jul. 4, 2024

Related U.S. Application Data

(63) Continuation of application No. PCT/JP2022/024398, filed on Jun. 17, 2022.

(30) Foreign Application Priority Data

Sep. 13, 2021 (JP) ................................ 2021-148894

(51) Int. Cl.
*G06F 3/041* (2006.01)
*G06F 3/044* (2006.01)
(52) U.S. Cl.
CPC ........ *G06F 3/04162* (2019.05); *G06F 3/0441* (2019.05); *G06F 3/0442* (2019.05)
(58) Field of Classification Search
None
See application file for complete search history.

(56) References Cited

U.S. PATENT DOCUMENTS 12,455,662 B2 * 10/2025 Koike ................. G06F 3/04166
2008/0116904 A1 * 5/2008 Reynolds ............... G06F 3/044
324/678

(Continued)

FOREIGN PATENT DOCUMENTS

JP 2015515681 A 5/2015
JP 2019091442 A 6/2019

OTHER PUBLICATIONS

English Translation of International Search Report dated Aug. 30, 2022, for the corresponding International Patent Application No. PCT/JP2022/024398, 2 pages.

*Primary Examiner* — Donna V Bocar
(74) *Attorney, Agent, or Firm* — Seed Intellectual Property Law Group LLP

(57) ABSTRACT

The present invention relates to a sensor controller, an electronic device including the sensor controller, and a control method of the sensor controller. The sensor controller includes a plurality of transmission drivers, a plurality of output signal lines for outputting transmission signals output from the corresponding transmission drivers, to corresponding detection electrodes, and an intermediate potential supply unit including a potential generation circuit that includes a voltage source or a capacitive element separate from the transmission drivers, the intermediate potential supply unit being configured to output a voltage from the potential generation circuit at a timing at which potentials of signal waveforms start to transition from a first potential to a second potential higher than the first potential or from the second potential to the first potential, to thereby supply an intermediate potential between the first potential and the second potential to the output signal lines.

4 Claims, 20 Drawing Sheets

(56)         References Cited

U.S. PATENT DOCUMENTS

2013/0257745 A1    10/2013  Reynolds
2018/0004347 A1*   1/2018  Guedon .................. G06F 3/044
2019/0146602 A1     5/2019  Kadowaki et al.

* cited by examiner

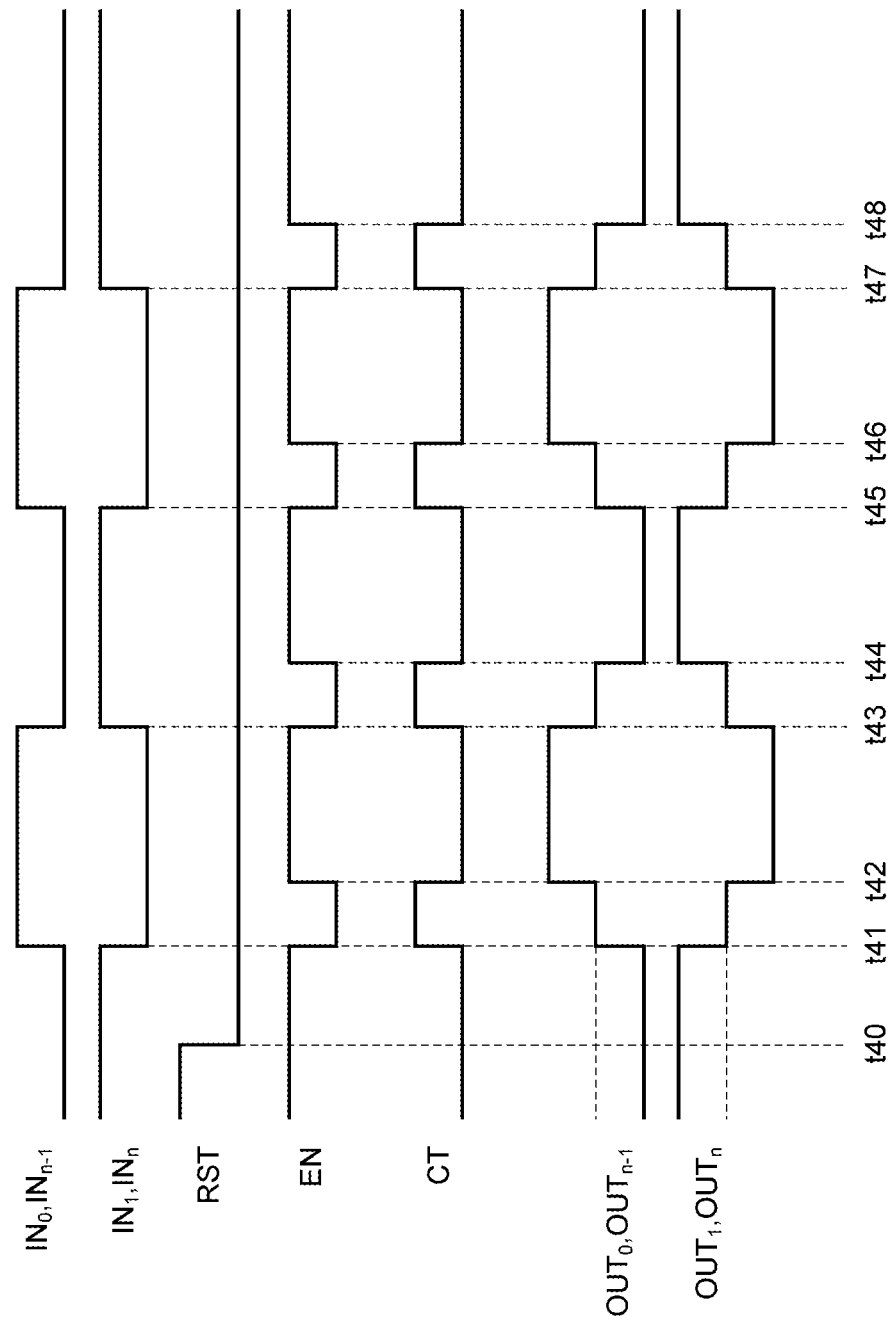
F I G . 4

F I G . 5 A
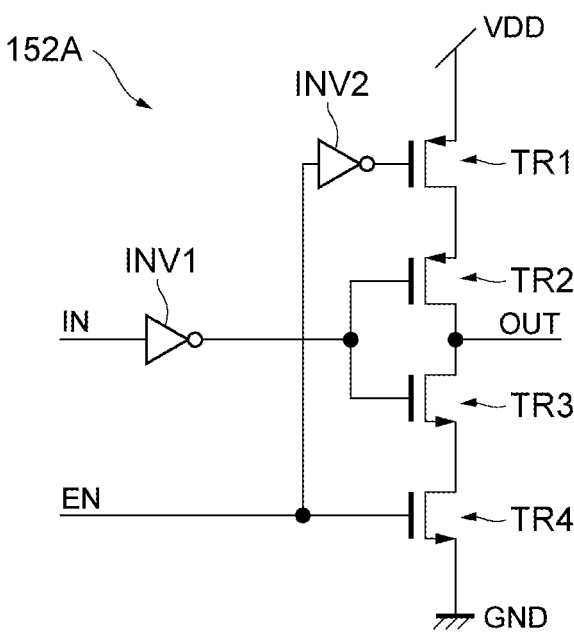
F I G . 5 B
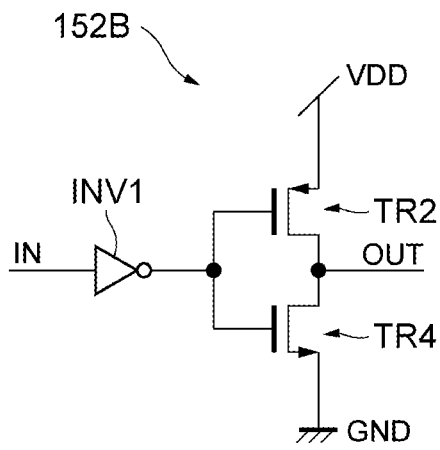

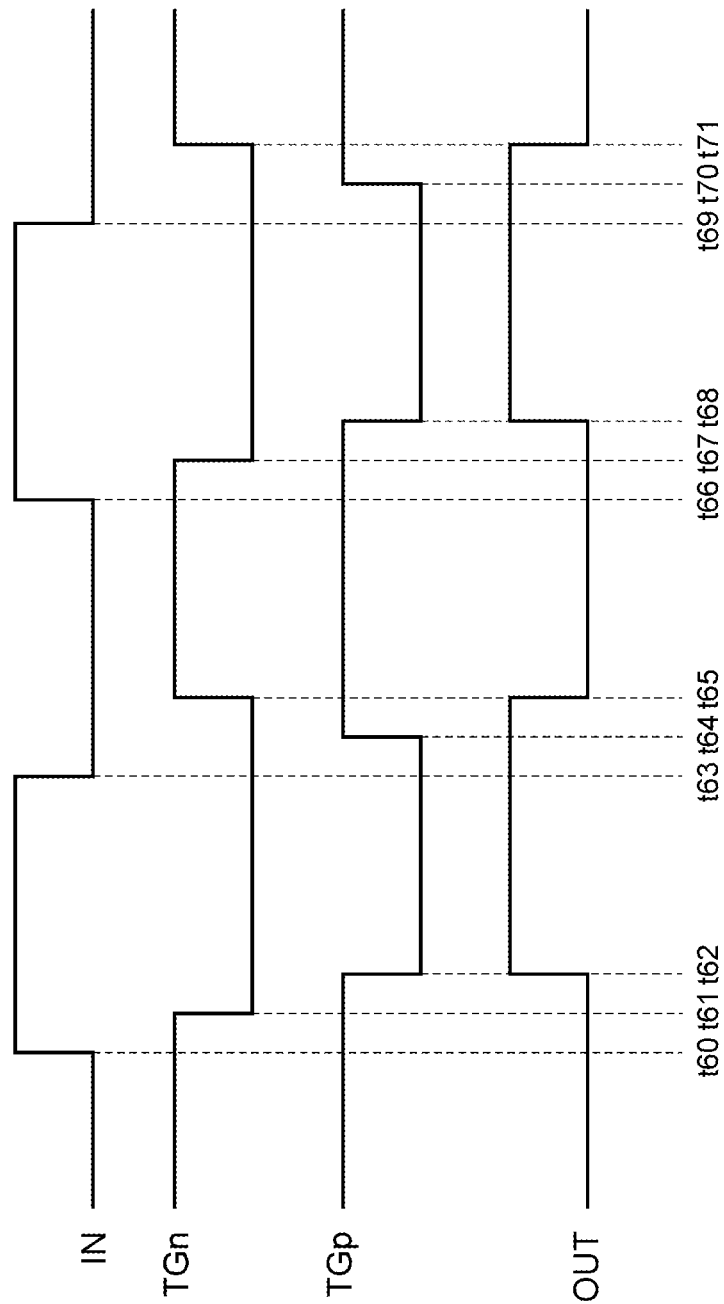
F I G . 6

F I G . 9
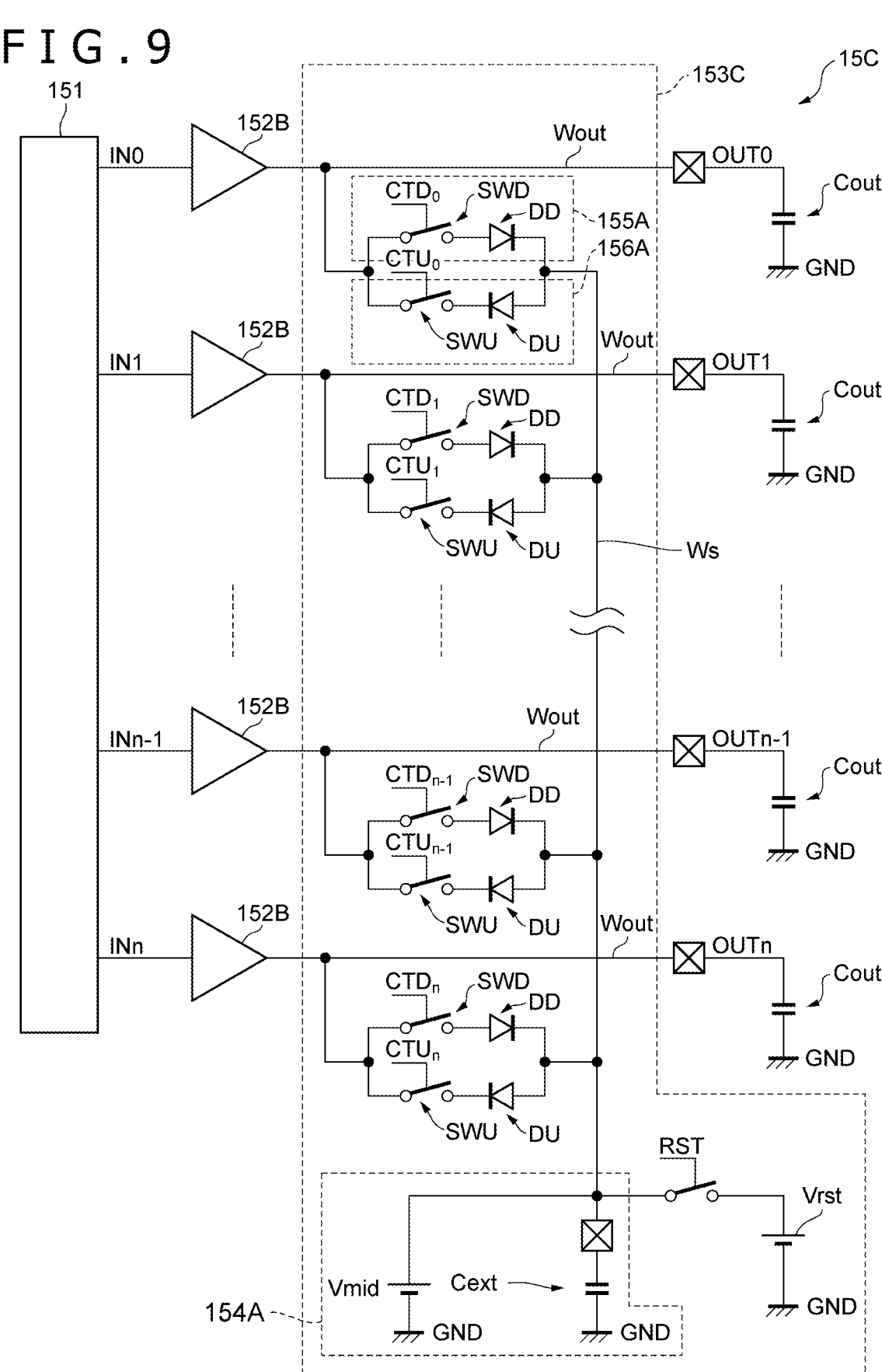

F I G . 1 5
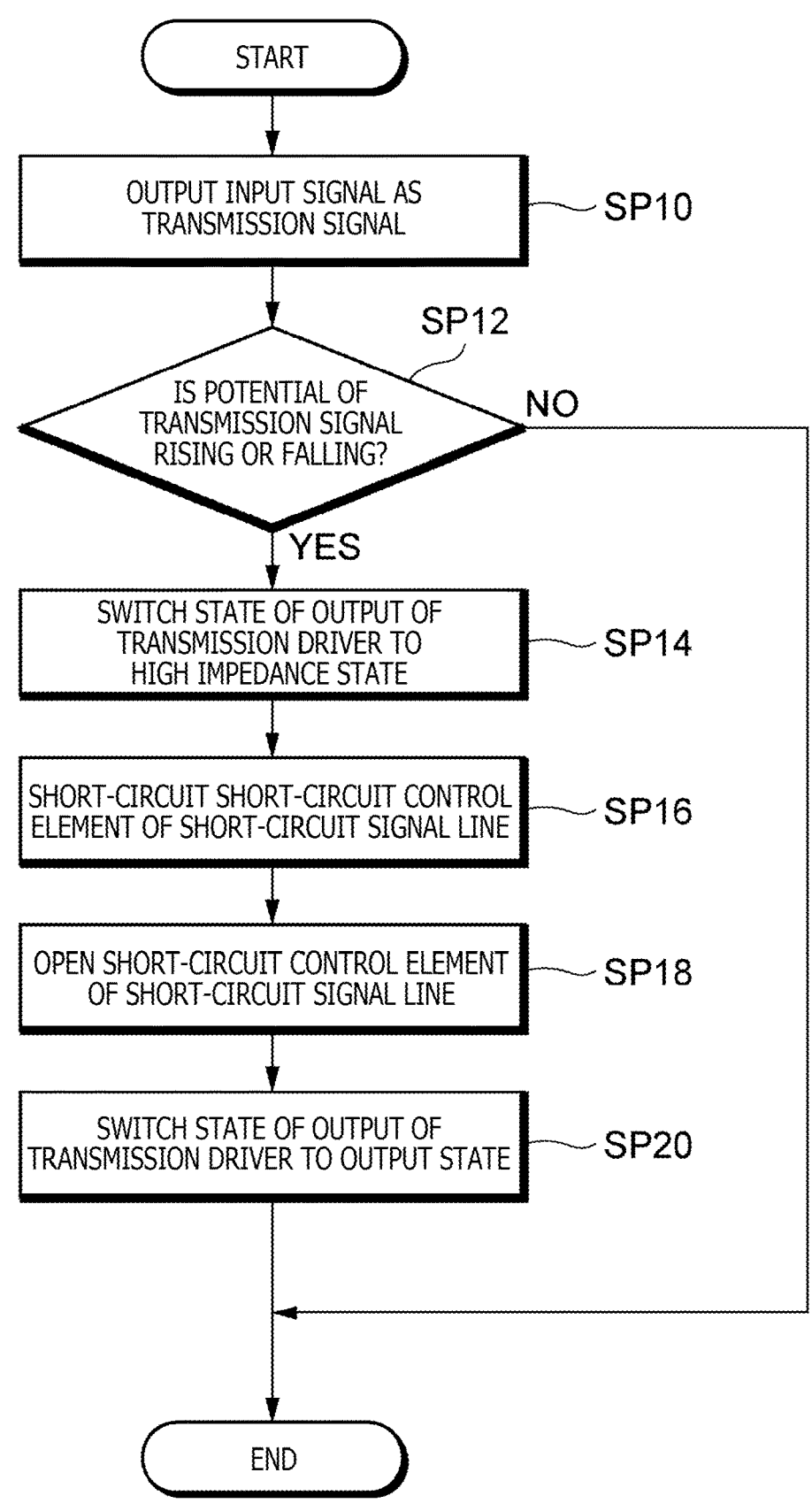

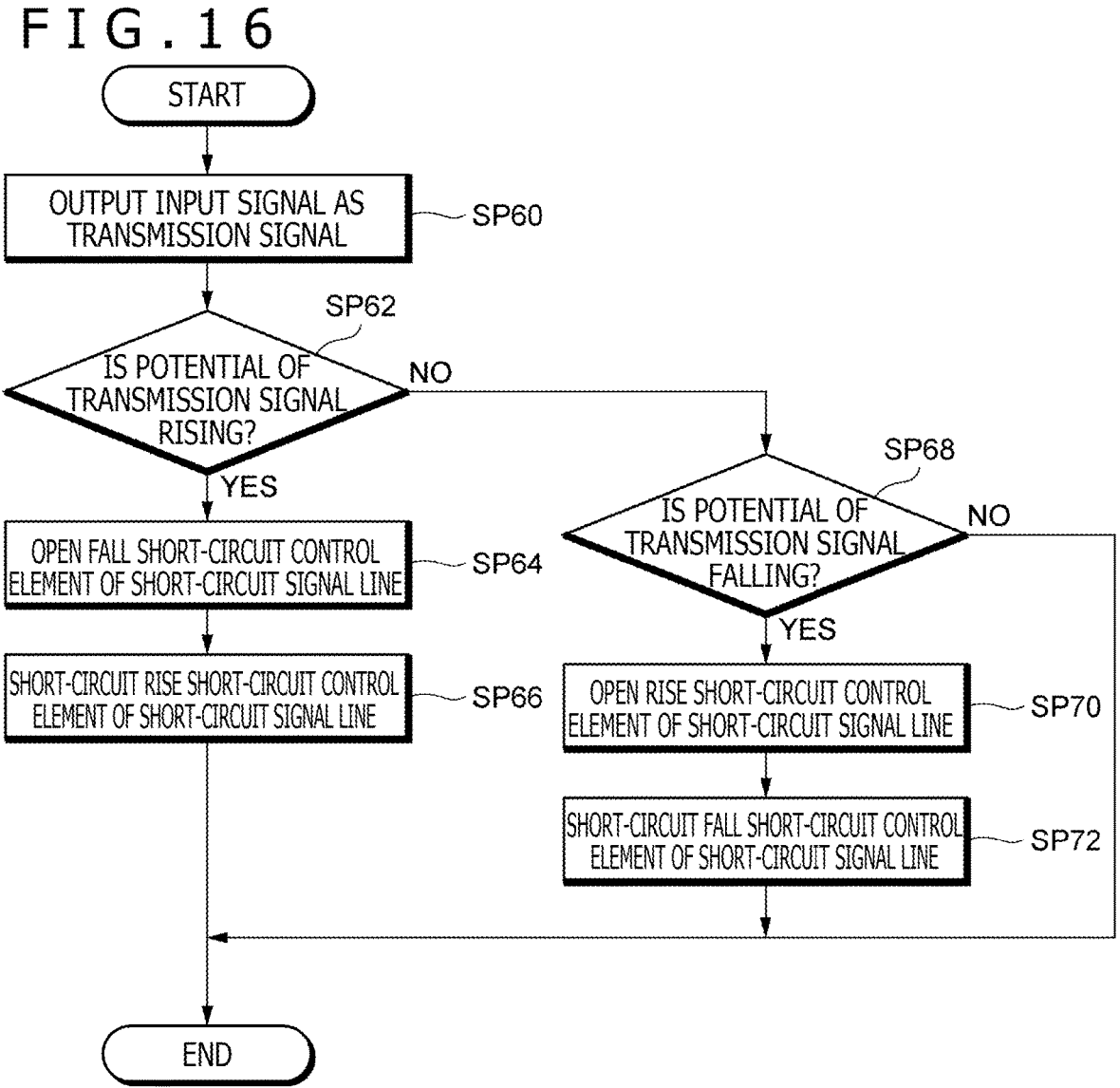
F I G . 1 6

F I G . 1 7
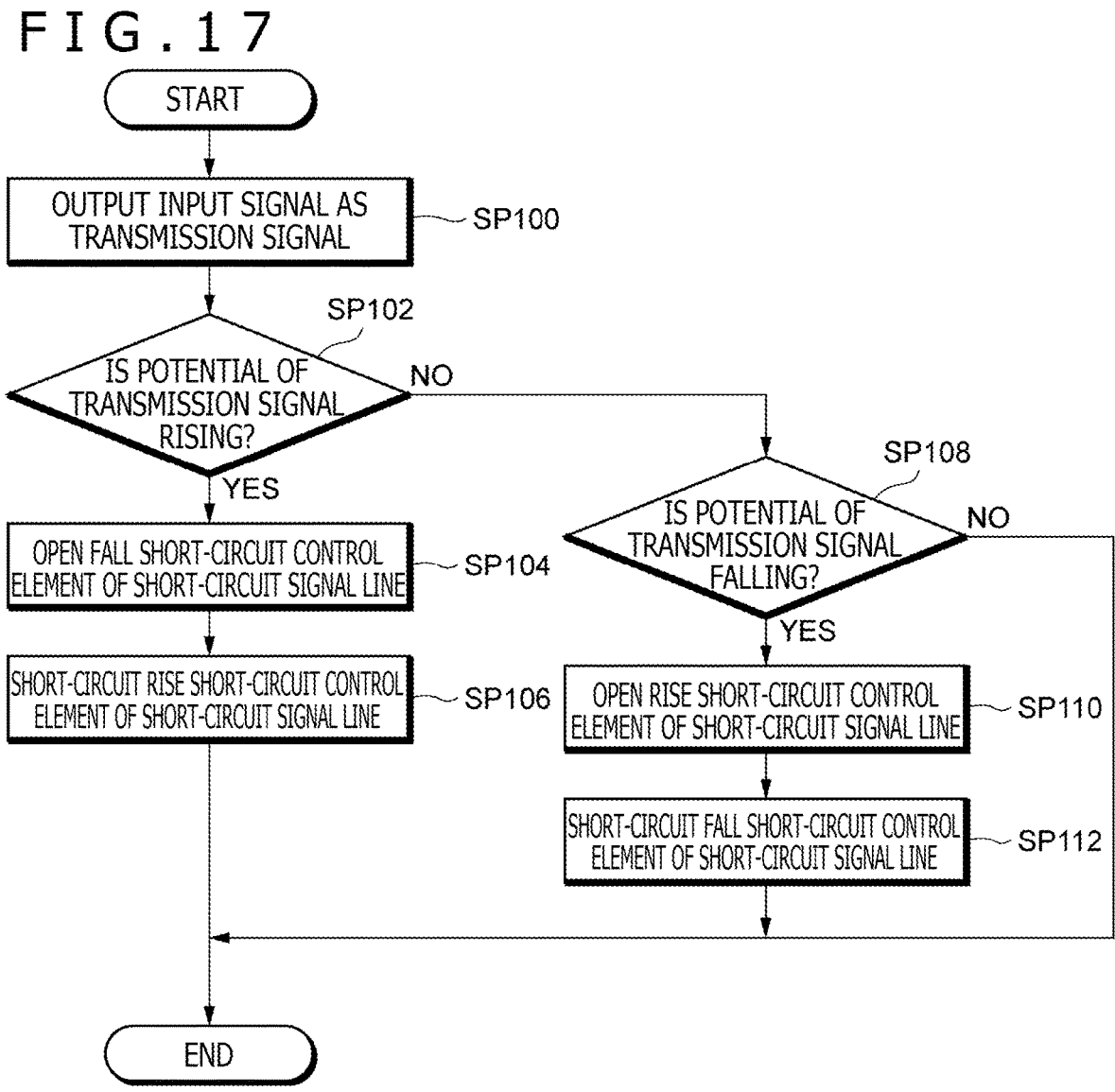

SENSOR CONTROLLER, ELECTRONIC DEVICE, AND CONTROL METHOD OF SENSOR CONTROLLER THAT SUPPLIES INTERMEDIATE POTENTIAL BETWEEN FIRST POTENTIAL AND SECOND POTENTIAL TO OUTPUT SIGNAL LINES

BACKGROUND

Technical Field

The present disclosure relates to a sensor controller, and particularly, to a sensor controller connected to a touch sensor, an electronic device, and a control method of the sensor controller.

Background Art

Conventionally, there is known a technique (what is generally called an adiabatic drive technique) of reducing the power consumption of a circuit which includes a plurality of transmission drivers arranged in parallel and in which the power consumption is reduced by use of a control signal to short-circuit output signal lines of the transmission drivers for a predetermined period and gradually shifting the potentials of the output signal lines from a high level to a low level through an intermediate potential that is a potential between the high level and the low level or from the low level to the high level through the intermediate potential.

In relation to this, a tablet terminal is disclosed in Japanese Patent Laid-Open No. 2019-091442, the tablet terminal including a plurality of sensor electrodes; output signal lines provided corresponding to the sensor electrodes and connected to the sensor electrodes; switches corresponding to the output signal lines, one end of each of the switches being connected to the output signal line, another end of each of the switches being connected to a short-circuit line; and a control signal line for controlling the switches.

In Japanese Patent Laid-Open No. 2019-091442, the tablet terminal controls the switches to short-circuit the output signal lines for a certain period, at a timing at which the potentials of the sensor electrodes transition from the high level to the low level or from the low level to the high level. The tablet terminal supplies charge from the output signal lines with a potential in the high level to the output signal lines with a potential in the low level through the short-circuit line. In this way, the power consumption is reduced.

PRIOR ART DOCUMENT

Non Patent Document

Patent Document 1: Japanese Patent Laid-Open No. 2019-091442

BRIEF SUMMARY

Technical Problems

However, in the technique described in Japanese Patent Laid-Open No. 2019-091442, the output signal lines with the potential in the high level and the output signal lines with the potential in the low level are short-circuited with each other. Therefore, a through current may flow for the certain period, and the through current may hinder the reduction of power consumption. In addition, when the state of the output signal lines is shifted to a high impedance state to prevent the through current, it may be difficult to maintain the potential of the output signal lines at the intermediate potential.

The present disclosure has been made in view of the problems described above, and embodiments of the present disclosure provide a sensor controller, an electronic device, and a control method of the sensor controller that can reduce the power consumption more than in the configuration of supplying the charge from the output signal lines with a potential in a high level to the output signal lines with a potential in a low level through the short-circuit line.

Technical Solution

To solve the problems, a first embodiment of the present disclosure provides a sensor controller connected to a touch sensor including a plurality of detection electrodes arranged in a plane. The sensor controller includes a plurality of transmission drivers that, in operation, generates signal waveforms that transition between a first potential and a second potential higher than the first potential, and outputs the signal waveforms as transmission signals, a plurality of output signal lines that, in operation, outputs the transmission signals output from corresponding transmission drivers, to corresponding detection electrodes, and an intermediate potential supply unit including a potential generation circuit that includes a voltage source or a capacitive element separate from the transmission drivers, the intermediate potential supply unit, in operation, outputting a voltage from the potential generation circuit at a first timing at which potentials of the signal waveforms start to transition from the first potential to the second potential or from the second potential to the first potential, and supplying an intermediate potential between the first potential and the second potential to the output signal lines.

In addition, a second embodiment of the present disclosure provides a sensor controller connected to a touch sensor including a plurality of detection electrodes arranged in a plane. The sensor controller includes a plurality of transmission drivers that, in operation, generate signal waveforms that transition between a first potential and a second potential higher than the first potential, and outputs the signal waveforms as transmission signals, a plurality of output signal lines that, in operation, outputs the transmission signals output from corresponding transmission drivers to corresponding detection electrodes, and an intermediate potential supply unit that, in operation, generates an intermediate potential between the first potential and the second potential, supplies the intermediate potential to at least one of the output signal lines in a period from a timing at which potentials of the signal waveforms start to transition from the first potential to the second potential or from the second potential to the first potential to a timing at which a potential of the output signal line reaches the intermediate potential, and stops supplying the intermediate potential at a timing at which the potential of the output signal line reaches the intermediate potential.

In addition, a third embodiment of the present disclosure provides an electronic device including a touch sensor including a plurality of detection electrodes arranged in a plane, and a sensor controller connected to the touch sensor, the sensor controller including a plurality of transmission drivers that, in operation, generates signal waveforms that transition between a first potential and a second potential higher than the first potential, and outputs the signal waveforms as transmission signals, a plurality of output signal lines that, in operation, outputs the transmission signals output from the corresponding transmission drivers, to the corresponding detection electrodes, and an intermediate potential supply unit including a potential generation circuit that includes a voltage source or a capacitive element separate from the transmission drivers, the intermediate potential supply unit being configured to output a voltage from the potential generation circuit at a timing at which potentials of the signal waveforms start to transition from the first potential to the second potential or from the second potential to the first potential, to thereby supply an intermediate potential between the first potential and the second potential to the output signal lines.

In addition, a fourth embodiment of the present disclosure provides an electronic device including a touch sensor including a plurality of detection electrodes arranged in a plane, and a sensor controller connected to the touch sensor, the sensor controller including a plurality of transmission drivers that, in operation, generates signal waveforms that transition between a first potential and a second potential higher than the first potential, and outputs the signal waveforms as transmission signals, a plurality of output signal lines that, in operation, outputs the transmission signals output from corresponding transmission drivers, to corresponding detection electrodes, and an intermediate potential supply unit that, in operation, generates an intermediate potential between the first potential and the second potential, supplies the intermediate potential to at least one of the output signal lines in a period from a timing at which potentials of the signal waveforms start to transition from the first potential to the second potential or from the second potential to the first potential to a timing at which a potential of the output signal line reaches the intermediate potential, and stops supplying the intermediate potential at a timing at which the potential of the output signal line reaches the intermediate potential.

In addition, a fifth embodiment of the present disclosure provides a control method of a sensor controller connected to a touch sensor including a plurality of detection electrodes arranged in a plane. The control method includes generating, by a plurality of transmission drivers, signal waveforms that transition between a first potential and a second potential higher than the first potential, outputting the signal waveforms generated by the transmission drivers as transmission signals, outputting an intermediate potential between the first potential and the second potential from a potential generation circuit that includes a voltage source or a capacitive element separate from the transmission drivers, at a timing at which potentials of the signal waveforms start to transition from the first potential to the second potential or from the second potential to the first potential, and supplying the intermediate potential to each output signal line connected to an output side of a corresponding one of the transmission drivers.

In addition, a sixth embodiment of the present disclosure provides a control method of a sensor controller connected to a touch sensor including a plurality of detection electrodes arranged in a plane. The control method includes generating, by a plurality of transmission drivers, signal waveforms that transition between a first potential and a second potential higher than the first potential, outputting the signal waveforms generated by the transmission drivers as transmission signals, generating an intermediate potential between the first potential and the second potential, supplying the intermediate potential to at least one of output signal lines connected to an output side of a corresponding one of the transmission drivers in a period from a timing at which potentials of the signal waveforms start to transition from the first potential to the second potential or from the second potential to the first potential to a timing at which a potential of the output signal line reaches the intermediate potential, and stopping the supply of the intermediate potential at a timing at which the potential of the output signal line reaches the intermediate potential.

Advantageous Effect

According to the present disclosure, the through current can be suppressed, and the power consumption can be reduced more than in the configuration of supplying the charge from the output signal lines with the potential in the high level to the output signal lines with the potential in the low level through the short-circuit line.

BRIEF DESCRIPTION OF THE SEVERAL VIEWS OF THE DRAWINGS

FIG. 4 is a timing chart illustrating an example of transitions of a potential of each signal in the output circuit.

FIG. 5A is a diagram illustrating a first example of a circuit configuration of a transmission driver.

FIG. 5B is a diagram illustrating a second example of a circuit configuration of a transmission driver.

FIG. 6 is a timing chart illustrating an example of transitions of a potential of each signal in a transmission driver.

FIG. 9 is a diagram illustrating an example of a circuit configuration of an output circuit including an intermediate potential supply unit according to a third embodiment of the present disclosure.

FIG. 15 is a flow chart illustrating an example of a flow of a series of operations in the output circuit according to the first embodiment of the present disclosure.

FIG. 16 is a flow chart illustrating an example of a flow of a series of operations in the output circuit according to the third embodiment of the present disclosure.

FIG. 17 is a flow chart illustrating an example of a flow of a series of operations in the output circuit according to the fifth embodiment of the present disclosure.

Figure 1:
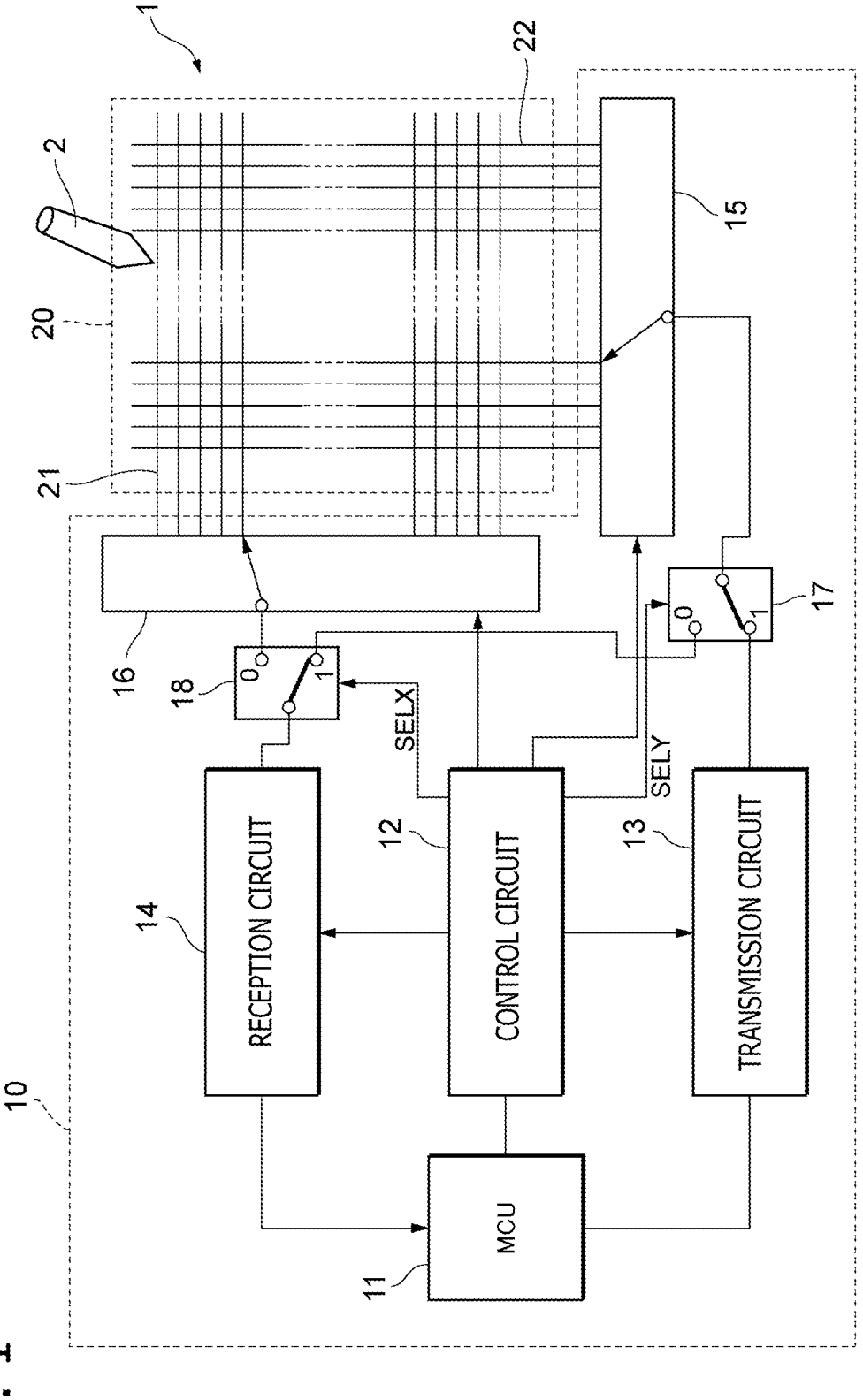
FIG. 1 is a diagram illustrating an example of an electronic device according to a first embodiment of the present disclosure.

Hereinafter, embodiments of the present disclosure (hereinafter, each of them is referred to as the "present embodiment") will be described with reference to the attached drawings. To facilitate the understanding of the description, the same reference symbols are provided as much as possible to the same constituent elements and acts in the drawings, and the description will not be repeated.

First Embodiment of the Present Disclosure

First, a first embodiment of the present disclosure will be described.

Circuit Configuration

FIG. 1 is a diagram illustrating an example of an electronic device 1 according to the first embodiment of the present disclosure. The electronic device 1 is a computer possessed by a user, and the electronic device 1 includes, for example, a tablet, a smartphone, a personal computer, or the like. The user can hold a stylus 2, which is a pen-type pointing device, and move the stylus 2 while pressing a pen tip against the touch surface included in the electronic device 1, to thereby draw a picture or a character on the electronic device 1. The stylus 2 is, for example, an electronic pen of active capacitance type (AES) and is capable of two-way communication with the electronic device 1.

The electronic device 1 detects an indicated position of the stylus 2 and executes various types of information processing according to the detection result. Specifically, the electronic device 1 transmits an uplink signal US to the stylus 2 and detects the indicated position of the stylus 2 according to a reception result of a downlink signal DS from the stylus 2 to execute a generation process of digital ink, a display process of a pointer, and the like. The electronic device 1 includes a sensor controller 10 and a touch sensor 20, in addition to a host processor, a memory, and a communication module (which are not illustrated).

The touch sensor 20 is a sensor of capacitance type including a plurality of detection electrodes arranged in a plane shape. The touch sensor 20 includes, for example, a plurality of X line electrodes (hereinafter, referred to as "linear electrodes 21") for detecting the position on the X-axis in the sensor coordinate system and a plurality of Y line electrodes (hereinafter, referred to as "linear electrodes 22") for detecting the position on the Y-axis. The linear electrodes 21 and 22 may contain a transparent conductive material including ITO (Indium Tin Oxide) or may include wire mesh sensors. Note that the touch sensor 20 may be a sensor of self-capacitance type including block-like electrodes arranged in a two-dimensional grid, instead of the sensor of mutual capacitance type.

The sensor controller 10 includes an MCU (Micro Controller Unit) 11, a control circuit 12, a transmission circuit 13, a reception circuit 14, an output circuit 15, a detection circuit 16, and selection circuits 17 and 18.

The output circuit 15 is a circuit that selects one of the plurality of linear electrodes 22 or a plurality of linear electrodes 22 adjacent to each other, on the basis of an instruction from the control circuit 12, amplifies an input signal transmitted from the control circuit 12 to a predetermined voltage, sets the signal as an output signal, and outputs the output signal to the linear electrode 22. In addition, the detection circuit 16 is a circuit that selects one of the plurality of linear electrodes 21 or a plurality of linear electrodes 21 adjacent to each other, on the basis of an instruction from the control circuit 12.

The selection circuit 17 is, for example, a multiplexer and is a circuit that makes a switch to use the linear electrode 22 selected by the output circuit 15, to receive a signal or transmit a signal. The selection circuit 17 connects the linear electrode 22 selected by the output circuit 15 to the reception circuit 14 through the selection circuit 18, when a selection signal SELY output from the control circuit 12 is in a low state "0." On the other hand, the selection circuit 17 supplies the input signal input from the control circuit 12, to the linear electrode 22 selected by the output circuit 15, when the selection signal SELY is in a high state "1."

The selection circuit 18 is, for example, a multiplexer. The selection circuit 18 selects one of a signal input through the selection circuit 17 from the linear electrode 22 selected by the output circuit 15 or a signal input from the linear electrode 21 selected by the detection circuit 16 and outputs the selected signal to the reception circuit 14. The selection circuit 18 connects the linear electrode 22 selected by the output circuit 15 to the reception circuit 14, when a selection signal SELX output from the control circuit 12 is in the low state. On the other hand, the selection circuit 18 connects the linear electrode 22 selected by the output circuit 15 through the selection circuit 17 to the reception circuit 14, when the selection signal SELX is in the high state.

The electronic device 1 has the following four types of modes, and the control circuit 12 controls each circuit in the sensor controller 10 while switching the modes in the following order. Hereinafter, the modes will be described in detail one by one.

A first mode is a mode for detecting the position of a finger. In this mode, the control circuit 12 shifts the selection signal SELY to the high state and shifts the selection signal SELX to the low state. That is, the transmission signal output from the control circuit 12 through the output circuit 15 is supplied to the linear electrode 22 selected by the output circuit 15, and a touch detection signal is transmitted from the touch sensor 20 to the linear electrode 22. In addition, the linear electrode 21 selected by the detection circuit 16 is connected to the reception circuit 14. According to such a configuration, the MCU 11 reads a change in the detection signal caused by contact of the finger with the sensor surface and calculates the coordinate position of the finger.

A second mode is a mode for transmitting the uplink signal US to the stylus 2. The control circuit 12 in this case shifts the selection signal SELY to the high state. As a result, the transmission signal output from the control circuit 12 through the output circuit 15 is supplied to the linear electrode 22 selected by the output circuit 15, and the uplink signal US is transmitted from the touch sensor 20 to the linear electrode 22. In this case, the output circuit 15 may select a neighborhood electrode indicated by the stylus 2 from the linear electrodes 22 and transmit the uplink signal US to the neighborhood electrode. The output circuit 15 may select all of the linear electrodes 22 at the same time and transmit a trigger signal US_trg to the linear electrodes 22.

A third mode is a mode for detecting a position signal DS_pos transmitted by the stylus 2, to detect the position of the stylus 2. The control circuit 12 in this case shifts the selection signal SELY to the low state, and the linear electrode 22 selected by the output circuit 15 is connected to the reception circuit 14 through the selection circuit 17. To obtain the X-axis coordinate of the stylus 2, the control circuit 12 shifts the selection signal SELX to the low state and connects the linear electrode 21 selected by the detection circuit 16 to the reception circuit 14. In this state, the MCU 11 reads, as signal level values, data output from the reception circuit 14, while sequentially selecting, one by one, a plurality of, for example, five, linear electrodes 21 selected by the detection circuit 16, around the linear electrode 21 closest to the indicated position of the stylus 2. The MCU 11 calculates the X-axis coordinate of the stylus 2 on the basis of the signal level distribution of the selected linear electrodes 21. In addition, to obtain the Y-axis coordinate of the stylus 2, the control circuit 12 shifts the selection signal SELX to the high state and connects the linear electrode 22 selected by the output circuit 15 to the reception circuit 14. In this state, the MCU 11 reads, as signal level values, data output from the reception circuit 14, while selecting, one by one, a plurality of, for example, five, linear electrodes 22 selected by the output circuit 15, around the linear electrode 22 closest to the indicated position of the stylus 2. The MCU 11 calculates the Y-axis coordinate of the stylus 2 on the basis of the signal level distribution of the selected linear electrodes 22.

A fourth mode is a mode for receiving a data signal DS_res transmitted by the stylus 2. Although either one of the linear electrode 21 and the linear electrode 22 may be used to receive the data signal DS_res, the case of using the linear electrode 21 to receive the data signal DS_res will be described here. The control circuit 12 shifts the selection signal SELX to the low state to connect the linear electrode 21 selected by the detection circuit 16 to the reception circuit 14. In addition, the control circuit 12 is operated such that the detection circuit 16 simultaneously selects a plurality of, for example, three, linear electrodes 21 around the linear electrode 21 closest to the indicated position of the stylus 2. In this state, the MCU 11 periodically reads the output from the reception circuit 14. Note that, to use the linear electrode 22 to receive the data signal DS_res, the selection signal SELY can be shifted to the low state, and the selection signal SELX can be shifted to the high state.

This completes the description of the operation of the control circuit 12 in each mode. As can be understood from the description, the electronic device 1 is configured to use the same touch sensor 20 to transmit and receive signals. Hereinafter, other components in the electronic device 1 illustrated in FIG. 1 will be described.

The MCU 11 is a microprocessor including a ROM (Read Only Memory) and a RAM (Random Access Memory) inside and configured to operate according to a predetermined program. The MCU 11 controls the control circuit 12 to output, as described above, each signal output from the control circuit 12 and executes a reading process of digital data output by the reception circuit 14.

The control circuit 12 is a logic circuit that accurately outputs each signal at a designated timing on the basis of an instruction from the MCU 11.

Figure 2:
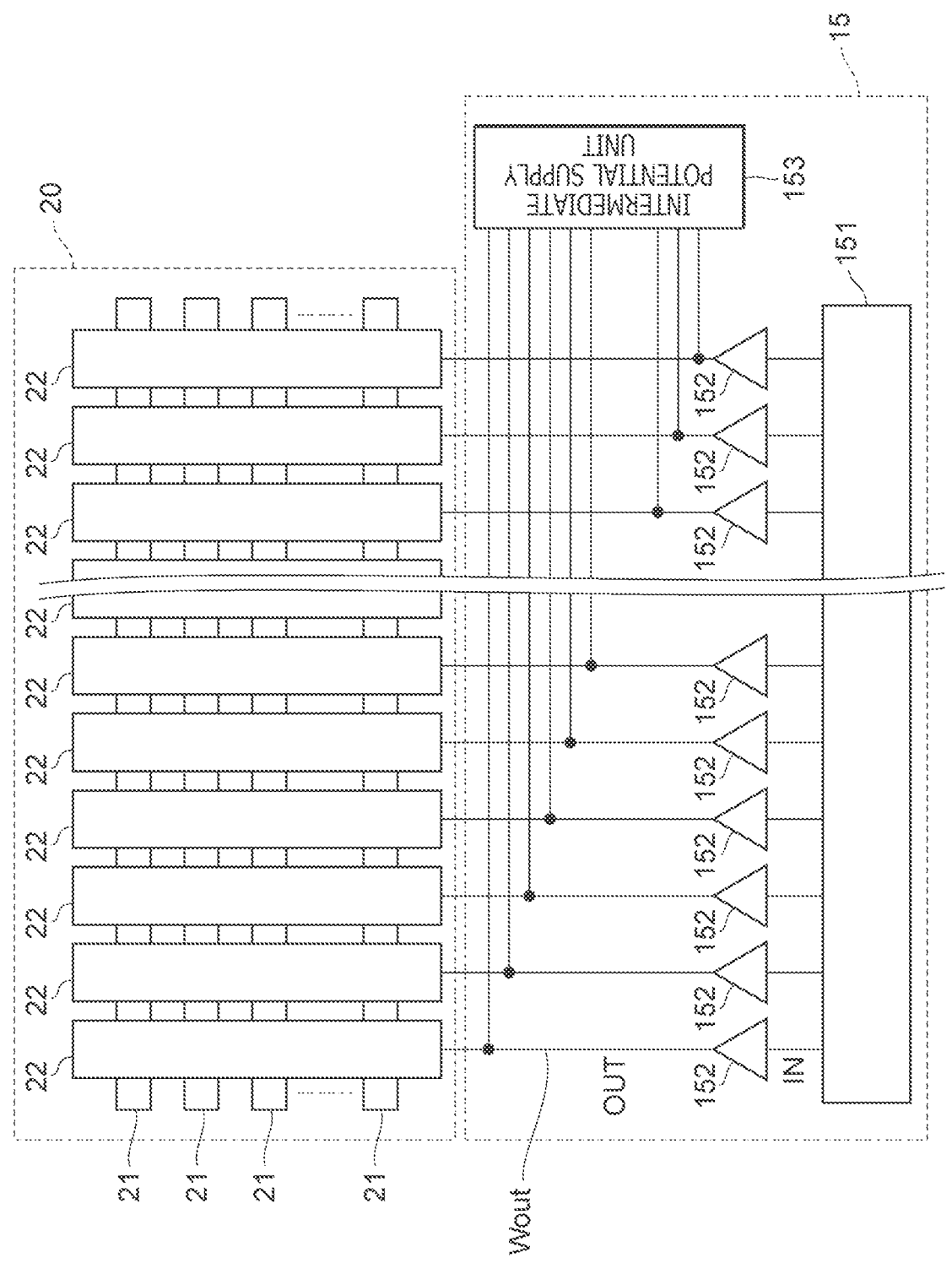
FIG. 2 is a diagram illustrating an example of part of a circuit configuration of an output circuit and a touch sensor.

This completes the description of the configuration and the operation of the electronic device 1. Next, a configuration of a circuit that functions when the output circuit 15 transmits the signal to the linear electrode 22 will be described in detail. FIG. 2 is a diagram illustrating an example of part of the circuit configuration of the output circuit 15 and the touch sensor 20 according to the present embodiment.

As illustrated in FIG. 2, the output circuit 15 includes a driver selection circuit 151, a plurality of transmission drivers 152, and an intermediate potential supply unit 153.

The driver selection circuit 151 selects some of the plurality of transmission drivers 152 that transmit signals to the linear electrodes 22 according to an instruction of the control circuit 12. The driver selection circuit 151 sets data signals transmitted from the transmission circuit 13, as a plurality of input signals IN, and outputs the input signals IN to the corresponding transmission drivers 152.

One transmission driver 152 is provided for each linear electrode 22. The transmission driver 152 amplifies the input signal IN input from the driver selection circuit 151 to a signal with a potential difference that allows transmission of the signal from the linear electrode 22. The transmission driver 152 sets the amplified signal as a transmission signal OUT and transmits the transmission signal OUT to the corresponding linear electrode 22 through an output signal line Wout. Here, the potential difference that allows transmission of the signal from the linear electrode 22 is a potential difference equal to or greater than 5 V, for example, approximately 9 V, with a low level of, for example, 0 V (first potential), and a high level of equal to or greater than 5 V, for example, approximately 9 V (second potential).

The intermediate potential supply unit 153 generates an intermediate potential that is a potential between the high level and the low level. Here, the intermediate potential is a potential obtained by, for example, adding the values of the high level and the low level and dividing the resulting value by two. In addition, the intermediate potential supply unit 153 supplies the generated intermediate potential to the output signal line Wout corresponding to the transmission driver 152 selected by the driver selection circuit 151, at a timing at which the potential of the output signal line Wout transitions from the high level to the low level or at a timing at which the potential of the output signal line Wout transitions from the low level to the high level. In addition, the intermediate potential supply unit 153 stops the supply of the intermediate potential to the output signal line Wout at a timing at which the potential of the output signal line Wout to be provided with the intermediate potential reaches the intermediate potential.

Figure 3:
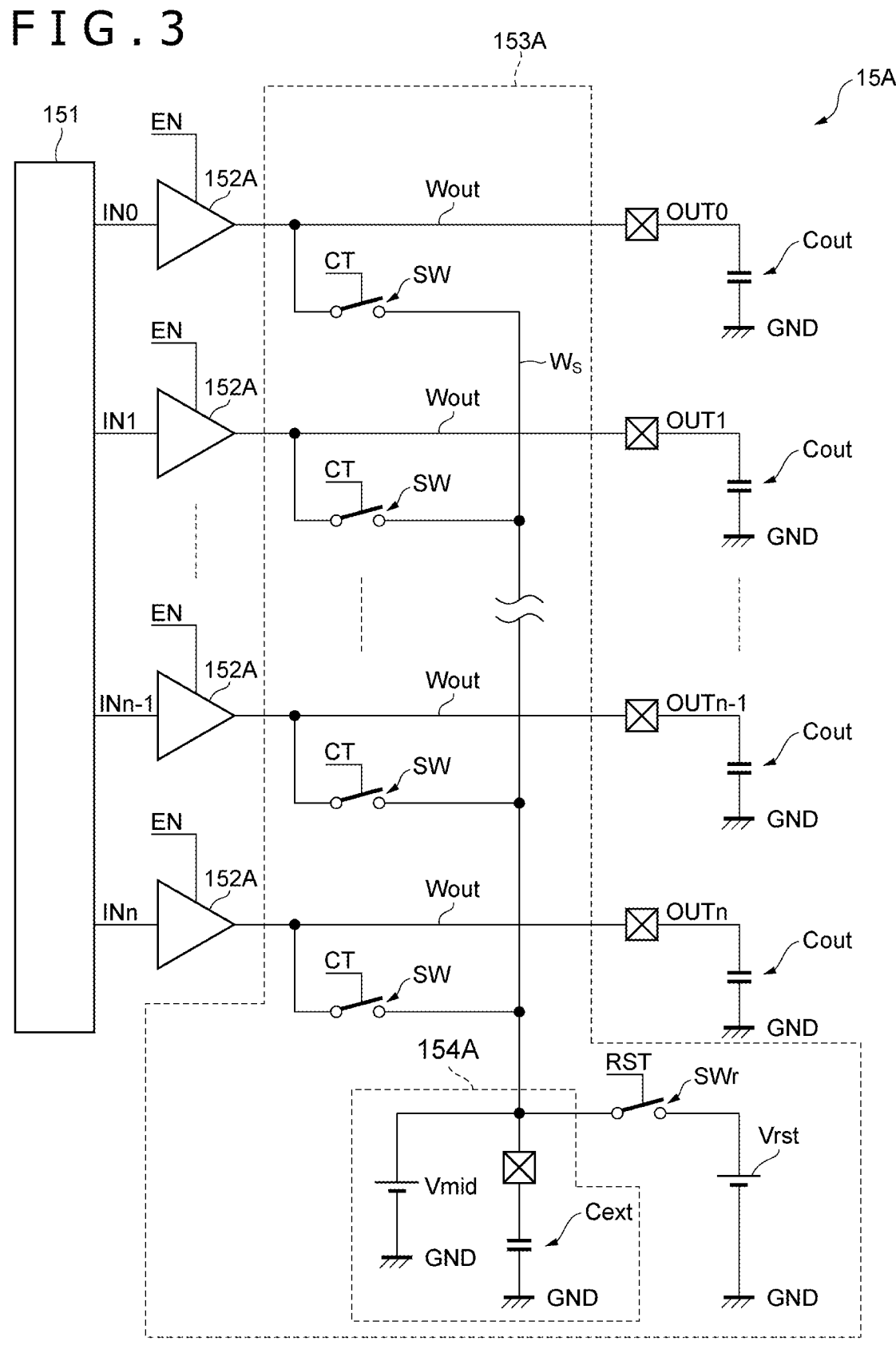
FIG. 3 is a diagram illustrating an example of a circuit configuration of the output circuit including an intermediate potential supply unit.

This completes the description of the configuration of the output circuit 15. Next, a configuration of a circuit of the intermediate potential supply unit 153 will be described in detail. FIG. 3 is a diagram illustrating an example of the circuit configuration of the output circuit 15 including an intermediate potential supply unit 153A according to the present embodiment.

As illustrated in FIG. 3, an output circuit 15A includes the driver selection circuit 151, a plurality of transmission drivers 152A, and the intermediate potential supply unit 153A. Note that, in FIG. 3, it is assumed that the driver selection circuit 151 selects n+1 transmission drivers 152A. Here, n is a positive integer. In addition, it is assumed that the linear electrode 22 includes a capacitive element Cout as a load capacitance. The capacitance of the capacitive element Cout is, for example, approximately 1200 pF.

The driver selection circuit 151 selects n+1 transmission drivers 152A as described above and transmits the input signals IN to the selected transmission drivers 152A. Here, an input signal IN0 is input to a 0th transmission driver 152A. In addition, an input signal IN1 is input to a first transmission driver 152A. An input signal INn−1 is input to an nth transmission driver 152A. An input signal INn is input to an (n+1)th transmission driver 152A.

The transmission driver 152A is a driver in which an output control function is added to the transmission driver 152 described above. The transmission driver 152A sets the mode to an output mode or a stop mode according to an output control signal EN output from the control circuit 12. The transmission driver 152A in the output mode amplifies the input signal IN to a signal with the potential difference that allows transmission of the signal from the linear electrode 22. The transmission driver 152A sets the amplified signal as the transmission signal OUT and transmits the transmission signal OUT to the corresponding linear electrode 22 through the output signal line Wout. On the other hand, the transmission driver 152A in the stop mode sets the state of output to a high impedance state "Hi-Z" and stops the transmission of the transmission signal OUT.

The intermediate potential supply unit 153A includes a potential generation circuit 154A, a plurality of short-circuit control elements SW, a short-circuit control element SWr, a reset voltage source Vrst, and a short-circuit signal line Ws.

The potential generation circuit 154A includes, for example, a voltage source Vmid and a capacitive element Cext. The voltage source Vmid is, for example, a voltage source that generates the intermediate potential. The potential generation circuit 154A generates, for example, 4.5 V that is the intermediate potential, and applies the generated intermediate potential to the short-circuit signal line Ws. The capacitive element Cext is, for example, a capacitor with a capacitance of approximately 1 uF. One end of the capacitive element Cext is connected to the short-circuit signal line Ws, and another end of the capacitive element Cext is connected to a reference line GND. The capacitive element Cext charges or discharges electricity according to the potential supplied to the short-circuit signal line Ws, to stabilize the potential of the short-circuit signal line Ws. Note that, although the potential generation circuit 154A includes the voltage source Vmid and the capacitive element Cext in the present embodiment, the potential generation circuit 154A may include only one of the voltage source Vmid and the capacitive element Cext.

The short-circuit control element SWr is, for example, a switch element or a transistor. One end of the short-circuit control element SWr is connected to the short-circuit signal line Ws, and another end of the short-circuit control element SWr is connected to one end of the reset voltage source Vrst. The short-circuit control element SWr short-circuits or opens both ends according to a reset signal RST output from the control circuit 12. Specifically, the short-circuit control element SWr short-circuits both ends when the state of the reset signal RST is the high state and opens both ends when the state of the reset signal RST is the low state.

The reset voltage source Vrst is a voltage source that generates an initial potential (for example, 4.5 V) and supplies, to the short-circuit signal line Ws, the initial potential generated when the short-circuit control element SWr is short-circuited. The one end of the reset voltage source Vrst is connected to the other end of the short-circuit control element SWr, and another end of the reset voltage source Vrst is connected to the reference line GND.

The short-circuit control element SW is, for example, a switch element or a transistor. One end of the short-circuit control element SW is connected to the corresponding output signal line Wout, and another end of the short-circuit control element SW is connected to the short-circuit signal line Ws. One short-circuit control element SW is provided for each transmission driver 152A, and the short-circuit control element SW short-circuits or opens both ends according to a control signal CT output from the control circuit 12. Specifically, the short-circuit control element SW short-circuits both ends when the state of the control signal CT is the high state and opens both ends when the state of the control signal CT is the low state.

In the output circuit 15A configured as described above, the control circuit 12 controls the state of the transmission drivers 152A to the high impedance state and controls the short-circuit control elements SW to the short-circuit state at a timing at which the state of one of the input signals IN0 to INn transitions from the high state to the low state or a timing at which one of the input signals IN0 to INn transitions from the low state to the high state. As a result, the output signal line Wout of each transmission driver 152A and the short-circuit signal line Ws are short-circuited, and the potential is supplied from the output signal lines Wout with a potential in the high level to the output signal lines Wout with a potential in the low level and the capacitive element Cext through the short-circuit signal line Ws. In addition, the potential is supplied from the voltage source Vmid and the capacitive element Cext to the output signal lines Wout with a potential in the low level through the short-circuit signal line Ws.

Next, the control circuit 12 controls the state of the transmission driver 152A to the output state and controls the short-circuit control elements SW to the open state at a timing at which the potential of each output signal line Wout, the short-circuit signal line Ws, and the one end of the capacitive element Cext reaches the intermediate potential. As a result, the corresponding transmission driver 152A shifts the potential of each output signal line Wout to the high level or the low level, and transmission signals OUT0, OUT1, OUTn−1, and OUTn are transmitted through the linear electrodes 22.

This completes the description of the configuration of the intermediate potential supply unit 153A. Next, a configuration of a circuit of the transmission driver 152 will be described in detail. FIG. 5A is a diagram illustrating an example of the circuit configuration of the transmission driver 152A according to the present embodiment. As illustrated in FIG. 5A, the transmission driver 152A includes, for example, NOT circuits INV1 and INV2, transistors TR1, TR2, TR3, and TR4, a power supply line VDD, and the reference line GND.

The NOT circuit INV2 is an inverter circuit including, for example, a transistor. The NOT circuit INV2 performs a NOT operation of the output control signal EN input from the control circuit 12 and outputs the signal obtained after the operation to a gate terminal of the transistor TR1.

The transistor TR1 is, for example, a P-type MOS (Metal-Oxide-Semiconductor) transistor. The gate terminal of the transistor TR1 is connected to an output terminal of the NOT circuit INV2. A source terminal of the transistor TR1 is connected to the power supply line VDD. A drain terminal of the transistor TR1 is connected to a source terminal of the transistor TR2. The transistor TR1 supplies the potential (high level) of the power supply line VDD to the source terminal of the transistor TR2 or stops the supply according to a signal output from the NOT circuit INV2. Specifically, the transistor TR1 supplies the potential (high level) of the power supply line VDD to the source terminal of the transistor TR2 when the state of the signal output from the NOT circuit INV2 is the low state, and stops the supply when the state of the signal output from the NOT circuit INV2 is the high state.

The transistor TR4 is, for example, an N-type MOS transistor. A gate terminal of the transistor TR4 is connected to the control circuit 12. A source terminal of the transistor TR4 is connected to the reference line GND. A drain terminal of the transistor TR4 is connected to a source terminal of the transistor TR3. The transistor TR4 discharges the electricity from the source terminal of the transistor TR3 toward the reference line GND or stops the discharge according to the output control signal EN output from the control circuit 12. Specifically, the transistor TR4 discharges the electricity from the source terminal of the transistor TR3 toward the reference line GND when the state of the output control signal EN is the high state, and stops the discharge of the electricity when the state of the output control signal EN is the low state.

The NOT circuit INV1 is an inverter circuit including, for example, a transistor. The NOT circuit INV1 performs a NOT operation of the input signal IN input from the driver selection circuit 151 and outputs the signal obtained after the operation to gate terminals of the transistors TR2 and TR3.

The transistor TR2 is, for example, a P-type MOS transistor. The gate terminal of the transistor TR2 is connected to an output terminal of the NOT circuit INV1. The source terminal of the transistor TR2 is connected to the drain terminal of the transistor TR1. A drain terminal of the transistor TR2 is connected to a drain terminal of the transistor TR3 and the output signal line Wout. The transistor TR2 supplies the potential of the drain terminal of the transistor TR1 to the output signal line Wout or stops the supply according to a signal output from the NOT circuit INV1. Specifically, the transistor TR2 supplies the potential of the drain terminal of the transistor TR1 to the output signal line Wout when the state of the signal output from the NOT circuit INV1 is the low state, and stops the supply when the state of the signal output from the NOT circuit INV1 is the high state.

The transistor TR3 is, for example, an N-type MOS transistor. The gate terminal of the transistor TR3 is connected to the output terminal of the NOT circuit INV1. The source terminal of the transistor TR3 is connected to the drain terminal of the transistor TR4. The drain terminal of the transistor TR3 is connected to the drain terminal of the transistor TR2 and the output signal line Wout. The transistor TR3 discharges the electricity from the output signal line Wout toward the drain terminal of the transistor TR4 or stops the discharge according to the signal output from the NOT circuit INV1. Specifically, the transistor TR3 discharges the electricity from the output signal line Wout toward the drain terminal of the transistor TR4 when the state of the signal output from the NOT circuit INV1 is the high state, and stops the discharge when the state of the signal output from the NOT circuit INV1 is the low state.

The power supply line VDD supplies, to the transmission driver 152A, a potential in the high level supplied from a voltage source not illustrated. Here, the potential in the high level is a potential equal to or greater than 5 V, for example, approximately 9 V. In addition, the reference line GND supplies a potential in the low level to the transmission driver 152A. Here, the potential in the low level is, for example, a potential of 0 V.

In the output mode in which the state of the output control signal EN is the low state, the transmission driver 152A configured in this way amplifies the input signal IN to a signal with the potential difference that allows transmission of the signal from the linear electrode 22. The transmission driver 152A sets the amplified signal as the transmission signal OUT and transmits the transmission signal OUT to the output signal line Wout. On the other hand, in the stop mode in which the state of the output control signal EN is the high state, the transmission driver 152A sets the state of output to the high impedance state "Hi-Z" and stops the transmission of the transmission signal OUT.

Figures 5C, 5D:
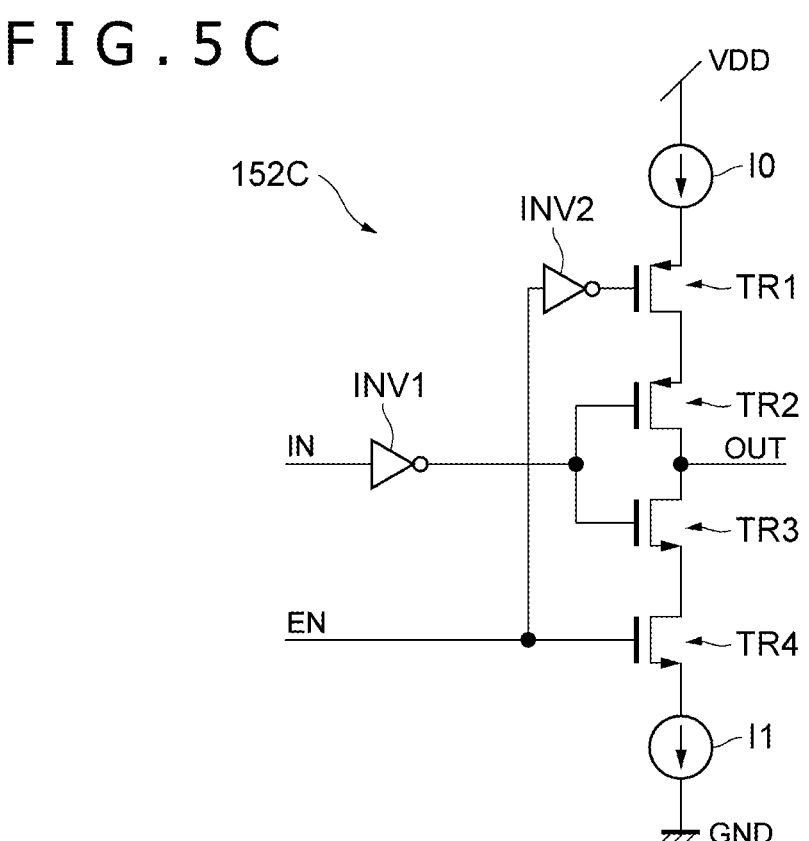
FIG. 5C is a diagram illustrating a third example of a circuit configuration of a transmission driver.
FIG. 5D is a diagram illustrating a fourth example of a circuit configuration of a transmission driver.

FIG. 5C is a diagram illustrating another example of the circuit configuration of the transmission driver 152 according to the present embodiment. As illustrated in FIG. 5C, a transmission driver 152C includes, for example, current sources I0 and I1 in addition to the components of the transmission driver 152A. In the description of the circuit configuration of the transmission driver 152C, the description of components similar to the components of the transmission driver 152A will not be repeated.

The current source I0 is, for example, a current mirror circuit including a MOS transistor, and the current source I0 restricts, to a constant current value, the current flowing from the power supply line VDD toward the source terminal of the transistor TR1.

The current source I1 is, for example, a current mirror circuit including a MOS transistor, and the current source I1 restricts, to a constant current value, the current flowing from the source terminal of the transistor TR4 toward the reference line GND.

The transmission driver 152C configured in this way restricts, to a constant current value, the current flowing from the power supply line VDD to the transmission driver 152C and the current flowing from the transmission driver 152C to the reference line GND, to thereby make the transition of the potential of the transmission signal OUT more gradual than that in the transmission driver 152A. As a result, the high frequency components of the transmission driver 152C are reduced, and the EMI (Electro Magnetic Compatibility) characteristics of the transmission driver 152C are better than those of the transmission driver 152A.

FIG. 5D is a diagram illustrating another example of the circuit configuration of the transmission driver 152 according to the present embodiment. As illustrated in FIG. 5D, a transmission driver 152D includes, for example, an OR circuit OR, an AND circuit AND, and delay circuits DL0 and DL1 in addition to the components of the transmission driver 152A. In the description of the circuit configuration of the transmission driver 152D, the description of components similar to the components of the transmission driver 152A will not be repeated.

The OR circuit OR includes, for example, a MOS transistor. The OR circuit OR performs an OR operation of an output signal of the NOT circuit INV1 and a trigger signal TGn output from the delay circuit DL1 and outputs the result of the operation to the delay circuit DL0.

The AND circuit AND includes, for example, a MOS transistor. The AND circuit AND performs an AND operation of an output signal of the NOT circuit INV1 and a trigger signal TGp output from the delay circuit DL0 and outputs the result of the operation to the delay circuit DL1.

The delay circuit DL0 is a buffer circuit including, for example, a MOS transistor. The delay circuit DL0 delays an output signal of the OR circuit OR by a delay time td. The delay circuit DL0 sets the delayed signal as the trigger signal TGp and outputs the trigger signal TGp to the gate terminal of the transistor TR2 and the AND circuit AND.

The delay circuit DL1 is a buffer circuit including, for example, a MOS transistor. The delay circuit DL1 delays an output signal of the AND circuit AND by the delay time td. The delay circuit DL1 sets the delayed signal as the trigger signal TGn and outputs the trigger signal TGn to the gate terminal of the transistor TR3 and the OR circuit OR.

In the transmission driver 152D configured in this way, the OR circuit OR, the AND circuit AND, the drain terminal and the source terminal of the transistor TR2, and the drain terminal and the source terminal of the transistor TR3 do not enter the electrically connected state at the same time. This can prevent the generation of a through current from the power supply line VDD to the reference line GND through the transistors TR1 to TR4.

FIG. 6 is a timing chart illustrating the transition of the potential of each signal in the transmission driver 152D according to the present embodiment. Note that, although not illustrated, it is assumed that the state of the output control signal EN is the high level at any time.

As illustrated in FIG. 6, the driver selection circuit 151 shifts the state of the input signal IN from the low state to the high state at time t60. At time t60, the NOT circuit INV1 performs the NOT operation of the input signal IN (high state) and outputs the signal switched to the low state as a result of the operation to the OR circuit OR and the AND circuit AND. At time t60, the AND circuit AND performs the AND operation of the trigger signal TGp (high state) and the signal (low state) output from the NOT circuit INV1 and outputs the signal switched to the low state as a result of the operation to the delay circuit DL1.

At time t60, the delay circuit DL1 receives the signal switched to the low state from the AND circuit AND and delays the signal by the delay time td. At time t61 that is a timing at which the delay time td has passed from time t60, the delay circuit DL1 sets the delayed result as the trigger signal TGn and outputs the trigger signal TGn in the low state to the gate terminal of the transistor TR3 and the OR circuit OR. At time t61, the transistor TR3 receives the trigger signal TGn in the low state and electrically disconnects the drain terminal and the source terminal from each other. As a result, the drain terminal and the source terminal of the transistor TR2 are electrically disconnected from each other, and the drain terminal and the source terminal of the transistor TR3 are electrically disconnected from each other. Therefore, the state of the output signal line Wout is switched to the high impedance state.

At time t61, the OR circuit OR performs the OR operation of the trigger signal TGn (low state) and the signal (low state) output from the NOT circuit INV1 and outputs the signal switched to the low state as a result of the operation to the delay circuit DL0.

At time t61, the delay circuit DL0 receives the signal switched to the low state from the OR circuit OR and delays the signal by the delay time td. At time t62 that is a timing at which the delay time td has passed from time t61, the delay circuit DL0 sets the delayed result as the trigger signal TGp and outputs the trigger signal TGp in the low state to the gate terminal of the transistor TR2 and the AND circuit AND. At time t62, the transistor TR2 receives the trigger signal TGp in the low state and electrically connects the drain terminal and the source terminal to each other. As a result, the potential in the high level is supplied from the power supply line VDD to the output signal line Wout through the transistors TR1 and TR2, and the potential of the transmission signal OUT transitions to the high level.

At time t63, the driver selection circuit 151 shifts the state of the input signal IN from the high state to the low state. At time t63, the NOT circuit INV1 performs the NOT operation of the input signal IN (low state) and outputs the signal switched to the high state as a result of the operation to the OR circuit OR and the AND circuit AND. At time t63, the OR circuit OR performs the OR operation of the trigger signal TGn (low state) and the signal (high state) output from the NOT circuit INV1 and outputs the signal switched to the high state as a result of the operation to the delay circuit DL0.

At time t63, the delay circuit DL0 receives the signal switched to the high state from the OR circuit OR and delays the signal by the delay time td. At time t64 that is a timing at which the delay time td has passed from time t63, the delay circuit DL0 sets the delayed result as the trigger signal TGp and outputs the trigger signal TGp in the high state to the gate terminal of the transistor TR2 and the AND circuit AND. At time t63, the transistor TR2 receives the trigger signal TGp in the high state and electrically disconnects the drain terminal and the source terminal from each other. As a result, the drain terminal and the source terminal of the transistor TR2 are electrically disconnected from each other, and the drain terminal and the source terminal of the transistor TR3 are electrically disconnected from each other. Therefore, the state of the output signal line Wout is switched to the high impedance state.

At time t64, the AND circuit AND performs the AND operation of the trigger signal TGp (high state) and the signal (high state) output from the NOT circuit INV1 and outputs the signal switched to the high state as a result of the operation to the delay circuit DL1. At time t64, the delay circuit DL1 receives the signal switched to the high state from the AND circuit AND and delays the signal by the delay time td. At time t65 that is a timing at which the delay time td has passed from time t64, the delay circuit DL1 sets the delayed result as the trigger signal TGn and outputs the trigger signal TGn in the high state to the gate terminal of the transistor TR3 and the OR circuit OR. At time t65, the transistor TR3 receives the trigger signal TGn in the high state and electrically connects the drain terminal and the source terminal to each other. As a result, the electricity is discharged from the output signal line Wout toward the reference line GND through the transistors TR1 and TR2, and the potential of the transmission signal OUT transitions to the low level.

Figure 5E:
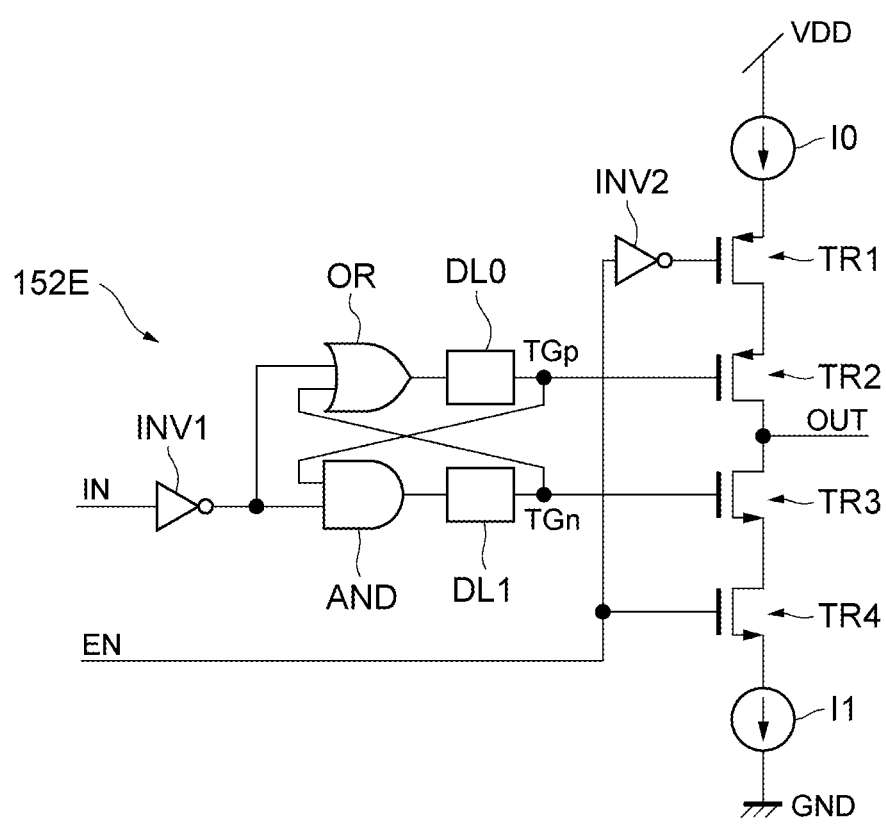
FIG. 5E is a diagram illustrating a fifth example of a circuit configuration of a transmission driver.

FIG. 5E is a diagram illustrating another example of the circuit configuration of the transmission driver 152 according to the first embodiment of the present disclosure. As illustrated in FIG. 5E, a transmission driver 152E includes the configuration of the transmission driver 152D added to the configuration of the transmission driver 152C. Therefore, the circuit configuration of the transmission driver 152E will not be described.

As illustrated in FIG. 5E, the transmission driver 152E includes the combination of configurations of the transmission drivers 152C and 152D. Therefore, the high frequency components are reduced, and the EMI characteristics are better than those of the transmission driver 152A. This can also prevent the generation of a through current from the power supply line VDD to the reference line GND through the transistors TR1 to TR4.

Flow of a Series of Operations in Output Circuit

This completes the description of the configuration of the transmission driver 152. Next, the transition of the potential of each signal in the output circuit 15A will be described in detail. FIG. 4 is a timing chart illustrating the transition of the potential of each signal in the output circuit 15A according to the present embodiment.

At time t40, the control circuit 12 shifts the state of the reset signal RST to the low state to open both ends of the short-circuit control element SWr. This stops the supply of the initial potential from the reset voltage source Vrst to the short-circuit signal line Ws.

At time t41, the driver selection circuit 151 shifts the state of the input signals IN0 and INn−1 from the low state to the high state and shifts the state of the input signals IN1 and INn from the high state to the low state. The driver selection circuit 151 inputs the input signals IN0, IN1, INn−1, and INn to the corresponding transmission drivers 152A.

At time t41, the control circuit 12 shifts the state of the output control signal EN from the high state to the low state and sets the mode of each transmission driver 152A to the stop mode. In addition, at time t41, the control circuit 12 shifts the state of the control signal CT from the low state to the high state and outputs the control signal CT to each short-circuit control element SW to thereby short-circuit both ends of each short-circuit control element SW. As a result, the output signal lines Wout are short-circuited at time t41 through the short-circuit control elements SW in which both ends are short-circuited. At time t41, the charge is supplied from the output signal lines Wout with the potential in the high level and the potential generation circuit 154A to the output signal lines Wout with the potential in the low level, and this shifts the potential of each of the transmission signals OUT0, OUT1, OUTn−1, and OUTn to the intermediate potential.

At time t42, the control circuit 12 shifts the state of the output control signal EN from the low state to the high state and sets the mode of each transmission driver 152A to the output mode. In addition, at time t42, the control circuit 12 shifts the state of the control signal CT from the high state to the low state and outputs the control signal CT to each short-circuit control element SW to thereby short-circuit both ends of each short-circuit control element SW. This releases the short-circuit state between the output signal lines Wout at time t42. At time t42, the charge is supplied from the corresponding transmission drivers 152A, and the potential of each of the transmission signals OUT0 and OUTn−1 transitions from the intermediate potential to the high level. On the other hand, the electricity is discharged from the corresponding transmission drivers 152A, and the potential of each of the transmission signals OUT1 and OUTn transitions from the intermediate potential to the low level.

At time t43, the control circuit 12 shifts the state of the output control signal EN from the high state to the low state and sets the mode of each transmission driver 152A to the stop mode. In addition, at time t43, the control circuit 12 shifts the state of the control signal CT from the low state to the high state and outputs the control signal CT to each short-circuit control element SW to thereby open both ends of each short-circuit control element SW. As a result, the potential of each of the transmission signals OUT0, OUT1, OUTn−1, and OUTn is shifted to the intermediate potential at time t43, as with time t41.

At time t44, the control circuit 12 shifts the state of the output control signal EN from the low state to the high state and sets the mode of each transmission driver 152A to the output mode. In addition, at time t44, the control circuit 12 shifts the state of the control signal CT from the high state to the low state and outputs the control signal CT to each short-circuit control element SW to thereby short-circuit both ends of each short-circuit control element SW. As a result, the short-circuit state between the output signal lines Wout is released at time t44. At time t44, the charge is supplied from the corresponding transmission drivers 152A, and the potential of each of the transmission signals OUT0 and OUTn−1 transitions from the intermediate potential to the low level. On the other hand, the electricity is discharged from the corresponding transmission drivers 152A, and the potential of each of the transmission signals OUT1 and OUTn transitions from the intermediate potential to the high level.

This completes the description of the transition of the potential of each signal in the output circuit 15A. Next, a flow of a series of operations in the output circuit 15A will be described in detail. FIG. 15 is a flow chart illustrating the flow of the series of operations in the output circuit 15A according to the first embodiment of the present disclosure.

SP10

The transmission driver 152A amplifies the input signal IN input from the driver selection circuit 151 to a signal with the potential difference that allows transmission of the signal from the linear electrode 22. The transmission driver 152A sets the amplified signal as the transmission signal OUT and transmits the transmission signal OUT to the corresponding output signal line Wout. The process then moves to SP12.

SP12

The control circuit 12 determines whether or not the signal waveform of the transmission signal OUT rises from the low level to the high level or falls from the high level to the low level at this timing. If the determination is affirmative, the process moves to SP14. On the other hand, if the determination is negative, the series of operations ends.

SP14

The control circuit 12 sets the mode of the transmission driver 152A to the stop mode. As a result, the state of output of the transmission driver 152A is switched to the high impedance state. The process then moves to SP16.

SP16

The control circuit 12 controls both ends of each short-circuit control element SW to short-circuit. As a result, the output signal lines Wout are short-circuited through the short-circuit signal line Ws, and the potential is supplied from the potential generation circuit 154A and the output signal lines Wout with the potential in the high level to the output signal lines Wout with the potential in the low level through the short-circuit signal line Ws. The potentials of the short-circuit signal line Ws and the output signal lines Wout are shifted to the intermediate potential. The process then moves to SP18. Note that, when there are a plurality of short-circuit signal lines Ws as described in a second embodiment of the present disclosure described later, the control circuit 12 determines to which one of the short-circuit signal lines Ws each output signal line Wout is to be connected and controls the short-circuit control element SW corresponding to the determined short-circuit signal line Ws to short-circuit.

SP18

The control circuit 12 controls both ends of each short-circuit control element SW to open. As a result, the short-circuit of the output signal lines Wout is released. The process then moves to SP20.

SP20

The control circuit 12 sets the mode of the transmission driver 152A to the output mode. As a result, the potential in the high level or the low level is supplied from the transmission driver 152A to the output signal line Wout. The potential of the transmission signal OUT transitions from the intermediate potential to the high level or the low level according to the potential of the output signal line Wout.

Effects

As described above, the sensor controller 10 is connected to the touch sensor 20 including the plurality of linear electrodes 21 and 22 arranged in a plane shape in the present embodiment. The sensor controller 10 includes the plurality of transmission drivers 152A that generate the signal waveforms transitioning between the first potential (low level) and the second potential (high level) higher than the first potential and that output the signal waveforms as the transmission signals OUT, the plurality of output signal lines Wout for outputting the transmission signals OUT output from the corresponding transmission drivers 152A, to the corresponding linear electrodes 22, and the intermediate potential supply unit 153A including the potential generation circuit 154A that includes the voltage source Vmid or the capacitive element Cext separate from the transmission drivers 152, the intermediate potential supply unit 153A being configured to output a voltage from the potential generation circuit 154A at a first timing (time t41, time t43, time t45, and time t47), at which the potentials of the signal waveforms start to transition from the high level to the low level or from the low level to the high level, to thereby supply the intermediate potential between the high level and the low level to the output signal lines Wout.

According to this configuration, the sensor controller 10 can output the intermediate potential to the output signal lines Wout from the intermediate potential supply unit 153A including the potential generation circuit 154A including the voltage source Vmid or the capacitive element Cext separate from the transmission drivers 152A, to thereby stably supply the intermediate potential to the output signal lines Wout at a necessary timing. Therefore, according to the present invention, the sensor controller 10 can suppress the through current and reduce the power consumption more than in the conventional configuration.

Further, in the present embodiment, the potential generation circuit 154A is the capacitive element Cext connected to at least one of the plurality of output signal lines Wout.

According to this configuration, the sensor controller 10 can stably supply the intermediate potential from the capacitive element Cext to each output signal line Wout when the state of output of each transmission driver 152A is the high impedance state.

Further, in the present embodiment, an output side of the potential generation circuit 154A is connected to two or more of the plurality of output signal lines Wout.

According to this configuration, the sensor controller 10 can suppress the through current and reduce the power consumption more than in the conventional configuration.

Further, the sensor controller 10 in the present embodiment includes the control circuit 12 that transmits the control signal CT, the transmission driver 152A has the output mode for outputting the transmission signal OUT and the stop mode for shifting the state of output to the high impedance state, and the control circuit 12 controls the transmission driver 152A to enter the stop mode at the first timing and controls the transmission driver 152 to enter the output mode at a second timing (time t42, time t44, time t46, and time t48) that is a timing at which a predetermined time has passed from the first timing.

According to this configuration, the sensor controller 10 can switch the state of output of each transmission driver 152A to the high impedance state and provide a period for stably supplying the intermediate potential from the intermediate potential supply unit 153A to each output signal line Wout to thereby reduce the power consumption.

Further, the intermediate potential supply unit 153A in the present embodiment includes the plurality of short-circuit control elements SW in which both ends of each are short-circuited or opened according to the control signal CT, the one end of each is connected to the corresponding output signal line Wout, and the other end of each is connected to the output side of the potential generation circuit 154A, and the control circuit 12 controls the short-circuit control elements SW to short-circuit at the first timing and controls the short-circuit control elements SW to open at the second timing.

According to this configuration, the sensor controller 10 can suppress the through current and reduce the power consumption more than in the conventional configuration.

Further, in the present embodiment, the second potential (high level) is a potential equal to or greater than 5 V, and the second potential (high level) is a potential higher than the first potential (low level).

According to this configuration, the sensor controller 10 can reduce the power consumption even when the transmission drivers 152A are driven with a voltage equal to or greater than 5 V.

Second Embodiment of the Present Disclosure

This completes the description of the first embodiment of the present disclosure. Next, the second embodiment of the present disclosure will be described.

Circuit Configuration

Figure 7:
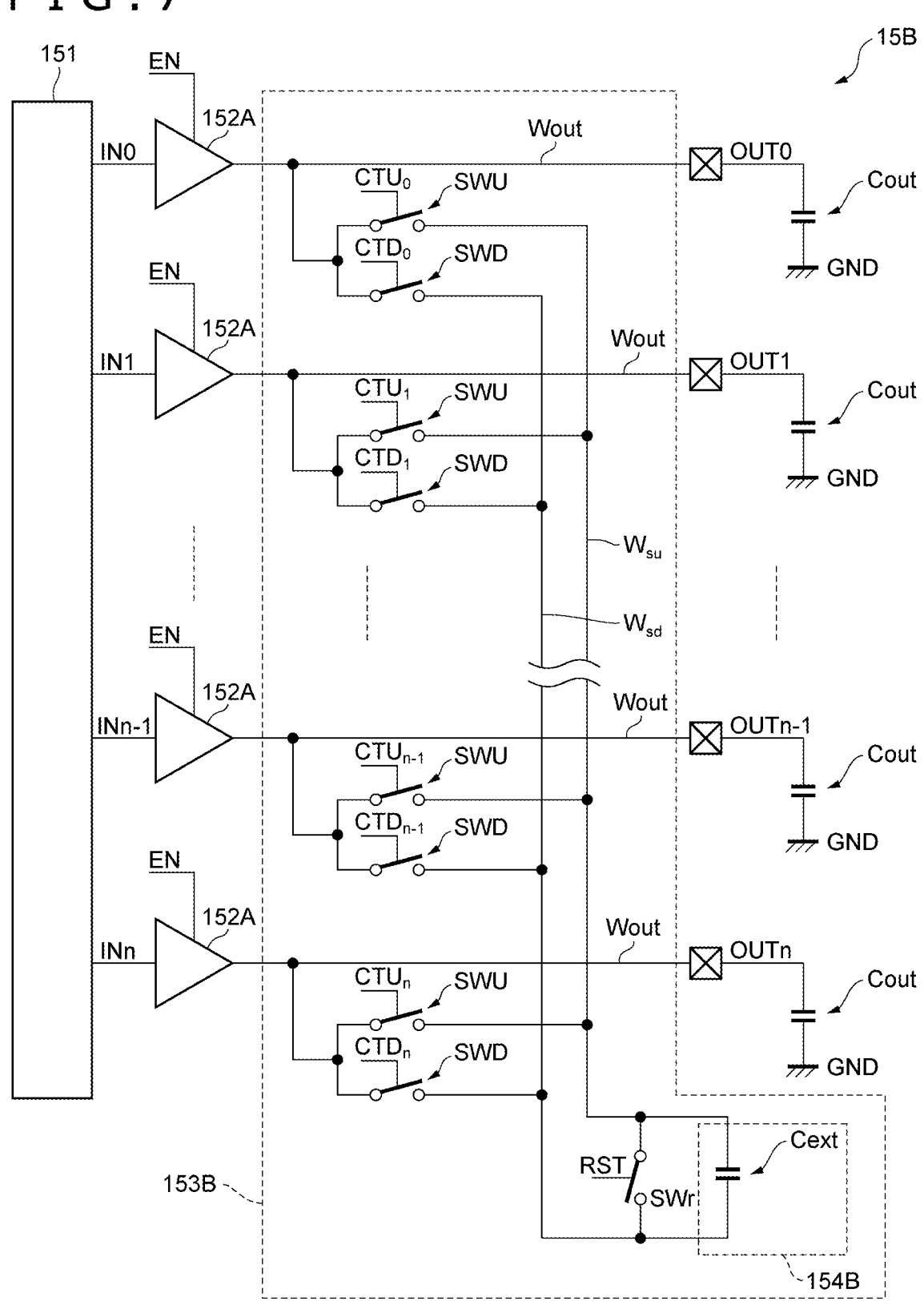
FIG. 7 is a diagram illustrating an example of a circuit configuration of an output circuit including an intermediate potential supply unit according to a second embodiment of the present disclosure.

FIG. 7 is a diagram illustrating an example of a circuit configuration of an output circuit 15B including an intermediate potential supply unit 153B according to the second embodiment of the present disclosure.

As illustrated in FIG. 7, the output circuit 15B includes the driver selection circuit 151, the plurality of transmission drivers 152A, and the intermediate potential supply unit 153B. Note that, in FIG. 7, it is assumed that the driver selection circuit 151 selects n+1 transmission drivers 152A. In addition, it is assumed that the linear electrode 22 includes the capacitive element Cout as a load capacitance. The capacitance of the capacitive element Cout is, for example, approximately 1200 pF.

The driver selection circuit 151 and the transmission drivers 152A are as described in the first embodiment of the present disclosure, and the description will not be repeated.

The intermediate potential supply unit 153B includes a potential generation circuit 154B, a plurality of short-circuit control elements SWU and SWD, short-circuit signal lines Wsu and Wsd, the short-circuit control element SWr, and the capacitive element Cext.

The potential generation circuit 154B includes, for example, the capacitive element Cext. The capacitive element Cext is, for example, a capacitor with capacitance of approximately 1 uF. The one end of the capacitive element Cext is connected to the short-circuit signal line Wsu, and the other end of the capacitive element Cext is connected to the short-circuit signal line Wsd. The capacitive element Cext charges or discharges the electricity according to the potential difference between the potentials supplied to the short-circuit signal lines Wsu and Wsd, to stabilize the potentials of the short-circuit signal lines Wsu and Wsd.

The short-circuit control element SWr is, for example, a switch element or a transistor, and the short-circuit control element SWr short-circuits or opens the short-circuit signal line Ws and the reset voltage source Vrst according to the reset signal RST output from the control circuit 12. The one end of the short-circuit control element SWr is connected to the short-circuit signal line Wsu, and the other end of the short-circuit control element SWr is connected to one end of the short-circuit signal line Wsd. The short-circuit control element SWr short-circuits the short-circuit signal lines Wsu and Wds to short-circuit them and releases the short-circuit of the short-circuit signal lines Wsu and Wds to open them.

The short-circuit control element SWU is, for example, a switch element or a transistor. One end of the short-circuit control element SWU is connected to the corresponding output signal line Wout, and another end of the short-circuit control element SWU is connected to the short-circuit signal line Wsu. One short-circuit control element SWU is provided for each transmission driver 152A, and the short-circuit control element SWU short-circuits or opens both ends according to a control signal CTU output from the control circuit 12 to each short-circuit control element SWU. Specifically, the short-circuit control element SWU short-circuits both ends when the state of the control signal CTU is the high state, and opens both ends when the state of the control signal CTU is the low state.

The short-circuit control element SWD is, for example, a switch element or a transistor. One end of the short-circuit control element SWD is connected to the corresponding output signal line Wout, and another end of the short-circuit control element SWD is connected to the short-circuit signal line Wsd. One short-circuit control element SWD is provided for each transmission driver 152A, and the short-circuit control element SWD short-circuits or opens both ends according to a control signal CTD output from the control circuit 12 to each short-circuit control element SWD. Specifically, the short-circuit control element SWD short-circuits both ends when the state of the control signal CTD is the high state, and opens both ends when the state of the control signal CTD is the low state.

In the output circuit 15B configured in this way, the control circuit 12 controls the state of the transmission driver 152A to the high impedance state at the timing at which the state of one of the input signals IN0 to INn transitions from the high state to the low state or at the timing at which the state of one of the input signals IN0 to INn transitions from the low state to the high state. In addition, the control circuit 12 allocates a value corresponding to a code (for example, orthogonal code) to each transmission driver 152A and determines to which one of the short-circuit signal lines Wsu and Wsd the corresponding output signal line Wout is to be connected. Specifically, the control circuit 12 determines to connect an output signal line Wout to the short-circuit signal line Wsu when the value of the orthogonal code corresponding to the output signal line Wout is "0," and determines to connect an output signal line Wout to the short-circuit signal line Wsd when the value of the orthogonal code corresponding to the output signal line Wout is "1," for example. Note that it is desirable that the number of values "0" and the number of values "1" included in the codes for determining the values allocated to the transmission drivers 152A be approximately the same.

At the timing at which the state of one of the input signals IN0 to INn transitions from the high state to the low state or at the timing at which the state of one of the input signals IN0 to INn transitions from the low state to the high state, the control circuit 12 controls, to the short-circuit state, the short-circuit control element SWU corresponding to the output signal line Wout determined to be connected to the short-circuit signal line Wsu and controls, to the short-circuit state, the short-circuit control element SWD corresponding to the output signal line Wout determined to be connected to the short-circuit signal line Wsd. Therefore, the output signal line Wout determined to be connected to the short-circuit signal line Wsu is short-circuited to the one end of the capacitive element Cext through the short-circuit signal line Wsu, and the output signal line Wout determined to be connected to the short-circuit signal line Wsd is short-circuited to the other end of the capacitive element Cext through the short-circuit signal line Wsd. As a result, the charge is exchanged between the output signal line Wout and the one end of the capacitive element Cext through the short-circuit signal line Wsu, and the charge is exchanged between the output signal line Wout and the other end of the capacitive element Cext through the short-circuit signal line Wsd. The potential of the output signal line Wout, the potentials of the short-circuit signal lines Wsu and Wsd, and the potentials of both ends of the capacitive element Cext reach the intermediate potential.

Next, the control circuit 12 controls the state of the transmission driver 152A to the output state and controls the short-circuit control elements SWU and SWD to the open state at the timing at which the potentials of each output signal line Wout, the short-circuit signal lines Wsu and Wsd, and both ends of the capacitive element Cext reach the intermediate potential. As a result, the corresponding transmission driver 152A shifts the potential of each output signal line Wout to the high level or the low level, and the transmission signals OUT0, OUT1, OUTn−1, and OUTn are transmitted through the linear electrodes 22.

Flow of a Series of Operations in Output Circuit

Figure 8:
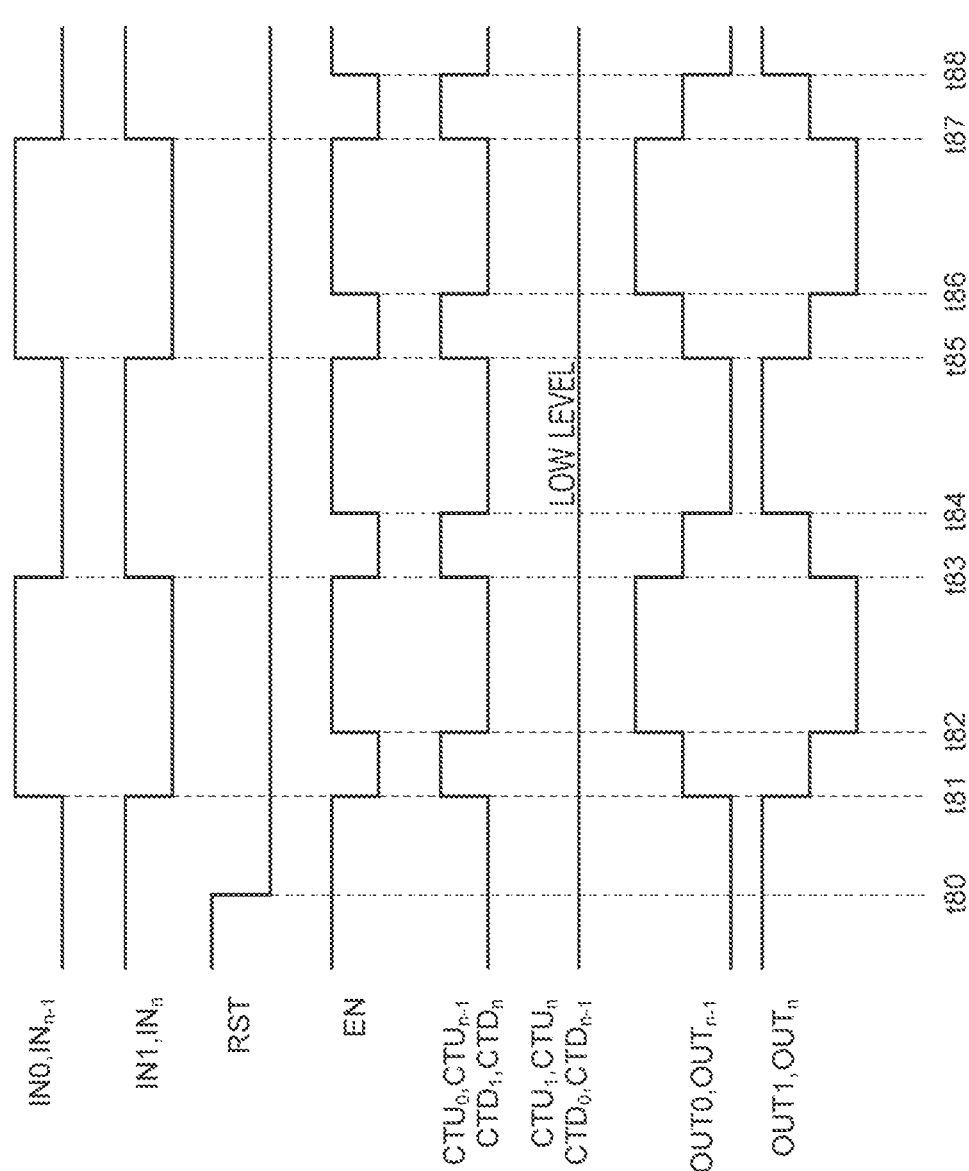
FIG. 8 is a timing chart illustrating transition of the potential of each signal in the output circuit according to the second embodiment of the present disclosure.

This completes the description of the circuit configuration of the output circuit 15B. Next, the transition of the potential of each signal in the output circuit 15B will be described in detail. FIG. 8 is a timing chart illustrating the transition of the potential of each signal in the output circuit 15B according to the second embodiment of the present disclosure. Note that, in FIG. 8, it is assumed that the control circuit 12 determines to connect the output signal lines Wout corresponding to the transmission signals OUT0 and OUTn−1 to the short-circuit signal line Wsu and connect the output signal lines Wout corresponding to the transmission signals OUT1 and OUTn to the short-circuit signal line Wsd.

At time t80, the control circuit 12 switches the state of the reset signal RST to the low state to open both ends of the short-circuit control element SWr. As a result, the short-circuit state between the short-circuit signal lines Wsu and Wsd is released.

At time t81, the driver selection circuit 151 shifts the state of the input signals IN0 and INn−1 from the low state to the high state and shifts the state of the input signals IN1 and INn from the high state to the low state. The driver selection circuit 151 inputs the input signals IN0, IN1, INn−1, and INn to the corresponding transmission drivers 152A.

At time t81, the control circuit 12 shifts the state of the output control signal EN from the high state to the low state and sets the mode of each transmission driver 152A to the stop mode. In addition, at time t81, the control circuit 12 shifts the state of control signals CTU0, CTUn−1, CTD1 and CTDn from the low state to the high state and outputs the control signals CTU0, CTUn−1, CTD1, and CTDn to short-circuit control elements SWU0, SWUn−1, SWD1, and SWDn to thereby short-circuit both ends of the short-circuit control elements SWU0, SWUn−1, SWD1, and SWDn.

As a result, at time t81, the output signal lines Wout corresponding to the transmission signals OUT0 and OUTn−1 are short-circuited to one end of the potential generation circuit 154B through the short-circuit control elements SWU0 and SWUn−1 in which both ends are short-circuited. In addition, at time t81, the output signal lines Wout corresponding to the transmission signals OUT1 and OUTn are short-circuited to another end of the potential generation circuit 154B through the short-circuit control elements SWD1 and SWDn in which both ends are short-circuited. At time t81, the charge is supplied from the output signal lines Wout corresponding to the transmission signals OUT1 and OUTn to the potential generation circuit 154B, and the charge is supplied from the potential generation circuit 154B to the output signal lines Wout corresponding to the transmission signals OUT0 and OUTn−1. As a result, the potential of each of the transmission signals OUT0, OUT1, OUTn−1, and OUTn is shifted to the intermediate potential.

At time t82, the control circuit 12 shifts the state of the output control signal EN from the low state to the high state and sets the mode of each transmission driver 152A to the output mode. In addition, at time t82, the control circuit 12 shifts the state of the control signals CTU0, CTUn−1, CTD1, and CTDn from the high state to the low state and outputs the control signals CTU0, CTUn−1, CTD1, and CTDn to the short-circuit control elements SWU0, SWUn−1, SWD1, and SWDn to thereby open both ends of the short-circuit control elements SWU0, SWUn−1, SWD1, and SWDn. As a result, the short-circuit state between each output signal line Wout and the potential generation circuit 154B is released at time t82. At time t82, the charge is supplied from the corresponding transmission drivers 152A, and the potential of each of the transmission signals OUT0 and OUTn−1 transitions from the intermediate potential to the high level. On the other hand, the electricity is discharged from the corresponding transmission drivers 152A, and the potential of each of the transmission signals OUT1 and OUTn transitions from the intermediate potential to the low level.

At time t83, the driver selection circuit 151 shifts the state of the input signals IN0 and INn−1 from the high state to the low state and shifts the state of the input signals IN1 and INn from the low state to the high state. The driver selection circuit 151 inputs the input signals IN0, IN1, INn−1, and INn to the corresponding transmission drivers 152A.

At time t83, the control circuit 12 shifts the state of the output control signal EN from the high state to the low state and sets the mode of each transmission driver 152A to the stop mode. In addition, at time t83, the control circuit 12 shifts the state of the control signals CTU0, CTUn−1, CTD1, and CTDn from the low state to the high state and outputs the control signals CTU0, CTUn−1, CTD1, and CTDn to the short-circuit control elements SWU0, SWUn−1, SWD1, and SWDn to thereby short-circuit both ends of the short-circuit control elements SWU0, SWUn−1, SWD1, and SWDn.

As a result, at time t83, the output signal lines Wout corresponding to the transmission signals OUT0 and OUTn−1 are short-circuited to the one end of the potential generation circuit 154B through the short-circuit control elements SWU0 and SWUn−1 in which both ends are short-circuited. In addition, at time t83, the output signal lines Wout corresponding to the transmission signals OUT1 and OUTn are short-circuited to the other end of the potential generation circuit 154B through the short-circuit control elements SWD1 and SWDn in which both ends are short-circuited. At time t83, the charge is supplied from the output signal lines Wout corresponding to the transmission signals OUT0 and OUTn−1 to the potential generation circuit 154B, and the charge is supplied from the potential generation circuit 154B to the output signal lines Wout corresponding to the transmission signals OUT1 and OUTn. As a result, the potential of each of the transmission signals OUT0, OUT1, OUTn−1, and OUTn is shifted to the intermediate potential.

At time t84, the control circuit 12 shifts the state of the output control signal EN from the low state to the high state and sets the mode of each transmission driver 152A to the output mode. In addition, at time t84, the control circuit 12 shifts the state of the control signals CTU0, CTUn−1, CTD1, and CTDn from the high state to the low state and outputs the control signals CTU0, CTUn−1, CTD1, and CTDn to the short-circuit control elements SWU0, SWUn−1, SWD1, and SWDn to thereby open both ends of the short-circuit control elements SWU0, SWUn−1, SWD1, and SWDn. As a result, the short-circuit state between each output signal line Wout and the potential generation circuit 154B is released at time t84. At time t84, the charge is supplied from the corresponding transmission drivers 152A, and the potential of each of the transmission signals OUT1 and OUTn transitions from the intermediate potential to the high level. On the other hand, the electricity is discharged from the corresponding transmission drivers 152A, and the potential of each of the transmission signals OUT0 and OUTn−1 transitions from the intermediate potential to the low level.

This completes the description of the transition of the potential of each signal in the output circuit 15B. Note that the flow of the series of operations in the output circuit 15B is similar to that of the first embodiment of the present disclosure, and the description will not be repeated.

Effects

As described above, in the sensor controller 10 of the present embodiment, the potential generation circuit 154B includes the capacitive element Cext, and the intermediate potential supply unit 153B includes the first short-circuit signal line Wsu connected to the one end of the capacitive element Cext, the second short-circuit signal line Wsd connected to the other end of the capacitive element Cext, the plurality of first short-circuit control elements SWU in which both ends of each are short-circuited or opened according to the control signal CTU, the one end of each is connected to the corresponding output signal line Wout, and the other end of each is connected to the first short-circuit signal line Wsu, and the plurality of second short-circuit control elements SWD in which both ends of each are short-circuited or opened according to the control signal CTD, the one end of each is connected to the corresponding output signal line Wout, and the other end of each is connected to the second short-circuit signal line Wsd.

According to this configuration, the sensor controller 10 can output the intermediate potential from the intermediate potential supply unit 153B including the potential generation circuit 154B including the capacitive element Cext to the output signal lines Wout to thereby stably supply the intermediate potential to the output signal lines Wout at a necessary timing. Therefore, according to the present invention, the sensor controller 10 can suppress the through current and reduce the power consumption more than in the conventional configuration.

Further, the control circuit 12 in the present embodiment determines, for each output signal line Wout, to which one of the first short-circuit signal line Wsu and the second short-circuit signal line Wsd the output signal line Wout is to be connected, controls the corresponding first short-circuit control element SWU to short-circuit at the first timing (time t81, time t83, time t85, and time t87) and open at the second timing (time t82, time t84, time t86, and time t88) when the control circuit 12 determines to connect the output signal line Wout to the first short-circuit signal line Wsu, and controls the corresponding second short-circuit control element SWD to short-circuit at the first timing (time t81, time t83, time t85, and time t87) and open at the second timing (time t82, time t84, time t86, and time t88) when the control circuit 12 determines to connect the output signal line Wout to the second short-circuit signal line Wsd.

According to this configuration, the sensor controller 10 can switch the state of output of each transmission driver 152A to the high impedance state and provide a period for stably supplying the intermediate potential from the intermediate potential supply unit 153A to each output signal line Wout, to thereby reduce the power consumption.

Third Embodiment of the Present Disclosure

This completes the description of the second embodiment of the present disclosure. Next, a third embodiment of the present disclosure will be described.
Circuit Configuration FIG. 9 is a diagram illustrating an example of a circuit configuration of an output circuit 15C including an intermediate potential supply unit 153C according to the third embodiment of the present disclosure.

As illustrated in FIG. 9, the output circuit 15C includes the driver selection circuit 151, a plurality of transmission drivers 152B, and the intermediate potential supply unit 153C. Note that, in FIG. 9, it is assumed that the driver selection circuit 151 selects n+1 transmission drivers 152B. In addition, it is assumed that the linear electrode 22 includes the capacitive element Cout as a load capacitance. The capacitance of the capacitive element Cout is, for example, approximately 1200 pF. Note that the driver selection circuit 151 is similar to that of the first embodiment of the present disclosure, and the description will not be repeated.

The transmission driver 152B is a driver in which the output control function is deleted from the transmission driver 152A. The transmission driver 152B amplifies the input signal IN to a signal with the potential difference that allows transmission of the signal from the linear electrode 22. The transmission driver 152B sets the amplified signal as the transmission signal OUT and transmits the transmission signal OUT to the corresponding linear electrode 22 through the output signal line Wout.

The intermediate potential supply unit 153C includes the potential generation circuit 154A, a plurality of output control circuits 155A and 156A, the short-circuit signal line Ws, the short-circuit control element SWr, and the reset voltage source Vrst. Note that the potential generation circuit 154A, the short-circuit control element SWr, and the reset voltage source Vrst are similar to those of the first embodiment of the present disclosure, and the description will not be repeated.

One output control circuit 155A is provided for each transmission driver 152B, and the output control circuit 155A electrically connects or electrically disconnects a current path in a first direction from the corresponding output signal line Wout to the short-circuit signal line Ws according to the control signal CTD output from the control circuit 12 to each corresponding transmission driver 152B. The output control circuit 155A includes the short-circuit control element SWD and a current control element DD.

The short-circuit control element SWD is, for example, a switch element or a transistor. The one end of the short-circuit control element SWD is connected to the corresponding output signal line Wout, and the other end of the short-circuit control element SWD is connected to an anode terminal of the current control element DD. The short-circuit control element SWD short-circuits or opens both ends according to the control signal CTD. Specifically, the short-circuit control element SWD short-circuits both ends when the state of the control signal CTD is the high state and opens both ends when the state of the control signal CTD is the low state.

The current control element DD is, for example a diode. A current path of the current control element DD in the first direction from the short-circuit control element SWD to the short-circuit signal line Ws is electrically connected, and a current path of the current control element DD in a direction from the short-circuit signal line Ws to the short-circuit control element SWD is electrically disconnected. The anode terminal of the current control element DD is connected to the short-circuit control element SWD, and a cathode terminal of the current control element DD is connected to the short-circuit signal line Ws.

One output control circuit 156A is provided for each transmission driver 152B. The output control circuit 156A electrically connects or electrically disconnects a current path in a second direction from the short-circuit signal line Ws to the corresponding output signal line Wout according to the control signal CTU output from the control circuit 12 to each corresponding transmission driver 152B. The output control circuit 156A includes the short-circuit control element SWU and a current control element DU.

The short-circuit control element SWU is, for example, a switch element or a transistor. The one end of the short-circuit control element SWU is connected to the corresponding output signal line Wout, and the other end of the short-circuit control element SWU is connected to a cathode terminal of the current control element DU. The short-circuit control element SWU short-circuits or opens both ends according to the control signal CTU. Specifically, the short-circuit control element SWU short-circuits both ends when the state of the control signal CTU is the high state, and opens both ends when the state of the control signal CTU is the low state.

The current control element DU is, for example, a diode. An anode terminal of the current control element DU is connected to the short-circuit signal line Ws, and the cathode terminal of the current control element DU is connected to the short-circuit control element SWU. A current path of the current control element DU in the second direction from the short-circuit signal line Ws to the short-circuit control element SWU is electrically connected, and a current path of the current control element DU in a direction from the short-circuit control element SWU to the short-circuit signal line Ws is electrically disconnected.

In the output circuit 15C configured in this way, the control circuit 12 controls the short-circuit control element SWU to the short-circuit state at the timing at which the state of one of the input signals IN0 to INn transitions from the low state to the high state. In addition, the control circuit 12 controls the short-circuit control element SWD to the short-circuit state at the timing at which the state of one of the input signals IN0 to INn transitions from the high state to the low state. As a result, the current path in the first direction from the output signal line Wout with the potential in the high level to the short-circuit signal line Ws is electrically connected, and the current path in the second direction from the short-circuit signal line Ws to the output signal line Wout with the potential in the low level is electrically connected.

Therefore, the charge is supplied from the output signal lines Wout with the potential in the high level to the capacitive element Cext and the output signal lines Wout with the potential in the low level through the short-circuit signal line Ws. In addition, the charge is supplied from the voltage source Vmid and the capacitive element Cext to the output signal lines Wout with the potential in the low level through the short-circuit signal lines Ws. As a result, the potentials of each output signal line Wout and the short-circuit signal line Ws reach the intermediate potential.

Next, the current control element DU electrically disconnects the current path in the second direction at a timing at which the potential of the short-circuit signal line Ws falls below the potential of the corresponding output signal line Wout. In addition, the current control element DD electrically disconnects the current path in the first direction at a timing at which the potential of the corresponding output signal line Wout falls below the potential of the short-circuit signal line Ws. In this way, the corresponding transmission driver 152B shifts the potential of each output signal line Wout from the intermediate potential to the high level or the low level, and the transmission signals OUT0, OUT1, OUTn−1, and OUTn are transmitted through the linear electrodes 22.

This completes the description of the configuration of the output circuit 15C. Next, a configuration of a circuit of the transmission driver 152B will be described. FIG. 5B is a diagram illustrating an example of the circuit configuration of the transmission driver 152B according to the present embodiment.

As illustrated in FIG. 5B, the transmission driver 152B according to the present embodiment is a driver in which the output control function is deleted from the transmission driver 152A. Specifically, the transmission driver 152B includes the components of the transmission driver 152A excluding the transistors TR1 and TR4. The transmission driver 152B amplifies the input signal IN to a signal with the potential difference that allows transmission of the signal from the linear electrode 22. The transmission driver 152B sets the amplified signal as the transmission signal OUT and transmits the transmission signal OUT to the corresponding linear electrode 22 through the output signal line Wout.

Figure 11A:
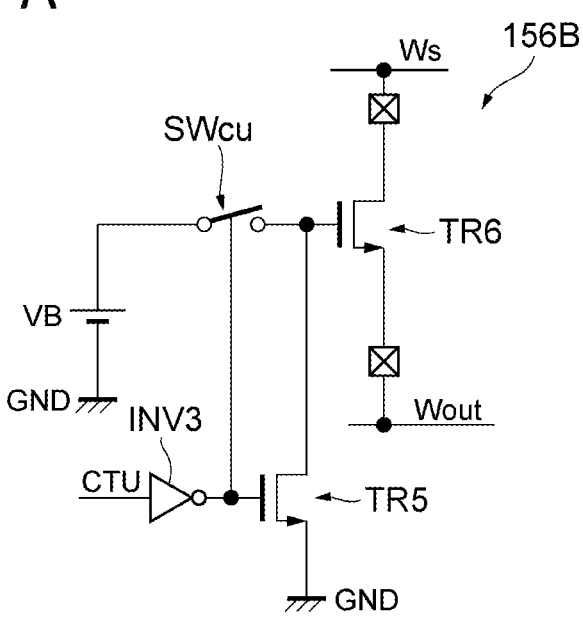
FIG. 11A is a diagram illustrating a first example of a circuit configuration of an output control circuit according to the third embodiment of the present disclosure.

This completes the description of the circuit configuration of the transmission driver 152B. Next, another example of the circuit configuration of the output control circuit 156 will be described. FIG. 11A is a diagram illustrating another example of the circuit configuration of the output control circuit 156 according to the third embodiment of the present disclosure.

As illustrated in FIG. 11A, an output control circuit 156B includes a NOT circuit INV3, transistors TR5 and TR6, a short-circuit control element SWcu, and a voltage source VB.

The NOT circuit INV3 is, for example, an inverter circuit including a MOS transistor. The NOT circuit INV3 performs a NOT operation of the control signal CTU output from the control circuit 12 and outputs the result of the operation to the short-circuit control element SWcu and a gate terminal of the transistor TR5.

The transistor TR5 is, for example, an N-type MOS transistor. The gate terminal of the transistor TR5 is connected to an output terminal of the NOT circuit INV3, a source terminal of the transistor TR5 is connected to the reference line GND, and a drain terminal of the transistor TR5 is connected to a gate terminal of the transistor TR6 and another end of the short-circuit control element SWcu. The transistor TR5 discharges the electricity from the gate terminal of the transistor TR6 toward the reference line GND according to a signal output from the NOT circuit INV3. Specifically, the transistor TR5 discharges the electricity from the gate terminal of the transistor TR6 toward the reference line GND when the signal output from the NOT circuit INV3 is in the high state, and stops the discharge of the electricity from the gate terminal of the transistor TR6 toward the reference line GND when the signal is in the low state.

The transistor TR6 is, for example, an N-type MOS transistor. The gate terminal of the transistor TR6 is connected to the drain terminal of the transistor TR5 and the other end of the short-circuit control element SWcu, a source terminal of the transistor TR6 is connected to the corresponding output signal line Wout, and a drain terminal of the transistor TR6 is connected to the short-circuit signal line Ws. The transistor TR6 supplies the potential of the short-circuit signal line Ws to the corresponding output signal line Wout according to the potential of the gate terminal. Specifically, the transistor TR6 supplies the potential of the short-circuit signal line Ws to the corresponding output signal line Wout when the potential of the gate terminal is the intermediate potential, and stops the supply of the potential from the short-circuit signal line Ws to the corresponding output signal line Wout when the potential of the gate terminal is in the low level. In addition, the transistor TR6 also stops the supply of the potential from the short-circuit signal line Ws to the corresponding output signal line Wout when the potential of the short-circuit signal line Ws and the potential of the corresponding output signal line Wout are the same.

The voltage source VB generates the intermediate potential and supplies the generated intermediate potential to one end of the short-circuit control element SWcu. One end of the voltage source VB is connected to the short-circuit control element SWcu, and another end of the voltage source VB is connected to the reference line GND.

The short-circuit control element SWcu is, for example, a transistor or a switch element. The one end of the short-circuit control element SWcu is connected to the voltage source VB, and the other end of the short-circuit control element SWcu is connected to the drain terminal of the transistor TR5 and the gate terminal of the transistor TR6. The short-circuit control element SWcu short-circuits or opens both ends according to the signal output from the NOT circuit INV3. Specifically, the short-circuit control element SWcu short-circuits both ends when the state of the signal output from the NOT circuit INV3 is the low state, and opens both ends when the signal is in the high state.

The output control circuit 156B configured in this way supplies the potential of the short-circuit signal line Ws to the corresponding output signal line Wout according to the control signal CTU output from the control circuit 12. Specifically, the output control circuit 156B supplies the potential of the short-circuit signal line Ws to the corresponding output signal line Wout when the state of the control signal CTU is the high state, and stops the supply of the potential from the short-circuit signal line Ws to the corresponding output signal line Wout when the state of the control signal CTU is the low state. In addition, the output control circuit 156B also stops the supply of the potential from the short-circuit signal line Ws to the corresponding output signal line Wout when the potential of the short-circuit signal line Ws and the potential of the corresponding output signal line Wout are the same.

Figure 11B:
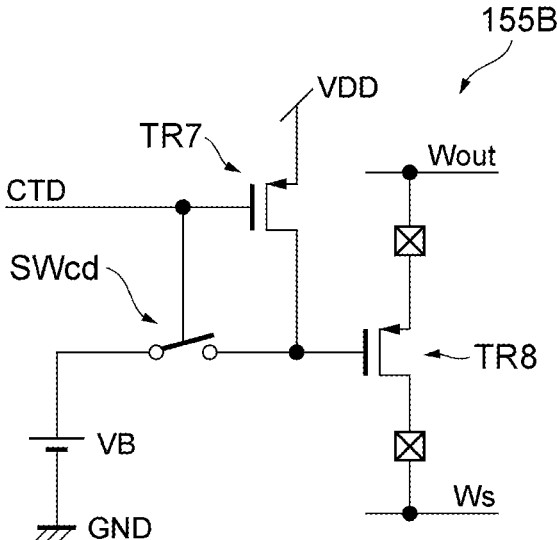
FIG. 11B is a diagram illustrating a second example of a circuit configuration of the output control circuit according to the third embodiment of the present disclosure.

This completes the description of the circuit configuration of the output control circuit 156B. Next, another example of the circuit configuration of the output control circuit 155 will be described. FIG. 11B is a diagram illustrating another example of the circuit configuration of the output control circuit 155 according to the third embodiment of the present disclosure.

As illustrated in FIG. 11B, an output control circuit 155B includes transistors TR7 and TR8, a short-circuit control element SWcd, and the voltage source VB.

The transistor TR7 is, for example, a P-type MOS transistor. A gate terminal of the transistor TR7 is connected to the control circuit 12, a source terminal of the transistor TR7 is connected to the power supply line VDD, and a drain terminal of the transistor TR7 is connected to a gate terminal of the transistor TR8 and another end of the short-circuit control element SWcd. The transistor TR7 supplies the potential (high level) of the power supply line VDD to the gate terminal of the transistor TR8 according to the control signal CTD output from the control circuit 12. Specifically, the transistor TR7 supplies the potential of the power supply line VDD to the gate terminal of the transistor TR8 when the control signal CTD is in the low state, and stops the supply of the potential to the gate terminal of the transistor TR6 of the power supply line VDD when the signal is in the high state.

The transistor TR8 is, for example, a P-type MOS transistor. The gate terminal of the transistor TR8 is connected to the drain terminal of the transistor TR7 and the other end of the short-circuit control element SWcd, a source terminal of the transistor TR8 is connected to the corresponding output signal line Wout, and a drain terminal of the transistor TR8 is connected to the short-circuit signal line Ws. The transistor TR8 supplies the potential of the corresponding output signal line Wout to the short-circuit signal line Ws according to the potential of the gate terminal. Specifically, the transistor TR8 supplies the potential of the corresponding output signal line Wout to the short-circuit signal line Ws when the potential of the gate terminal is the intermediate potential and, stops the supply of the potential from the corresponding output signal line Wout to the short-circuit signal line Ws when the potential of the gate terminal is in the high level. In addition, the transistor TR8 also stops the supply of the potential from the corresponding output signal line Wout to the short-circuit signal line Ws when the potential of the short-circuit signal line Ws and the potential of the corresponding output signal line Wout are the same.

The voltage source VB generates the intermediate potential and supplies the generated intermediate potential to one end of the short-circuit control element SWcd. The one end of the voltage source VB is connected to the short-circuit control element SWcd, and the other end of the voltage source VB is connected to the reference line GND.

The short-circuit control element SWcd is, for example, a transistor or a switch element. The one end of the short-circuit control element SWcd is connected to the voltage source VB, and the other end of the short-circuit control element SWcd is connected to the drain terminal of the transistor TR7 and the gate terminal of the transistor TR8. The short-circuit control element SWcd short-circuits or opens both ends according to the control signal CTD output from the control circuit 12. Specifically, the short-circuit control element SWcd short-circuits both ends when the state of the control signal CTD is the high state, and opens both ends when the signal is in the low state.

The output control circuit 155B configured in this way supplies the potential of the corresponding output signal line Wout to the short-circuit signal line Ws according to the control signal CTD output from the control circuit 12.

Specifically, the output control circuit 155B supplies the potential of the corresponding output signal line Wout to the short-circuit signal line Ws when the state of the control signal CTD is the high state, and stops the supply of the potential from the corresponding output signal line Wout to the short-circuit signal line Ws when the state of the control signal CTD is the low state. In addition, the output control circuit 155B also stops the supply of the potential from the corresponding output signal line Wout to the short-circuit signal line Ws when the potential of the short-circuit signal line Ws and the potential of the corresponding output signal line Wout are the same.

Figure 14:
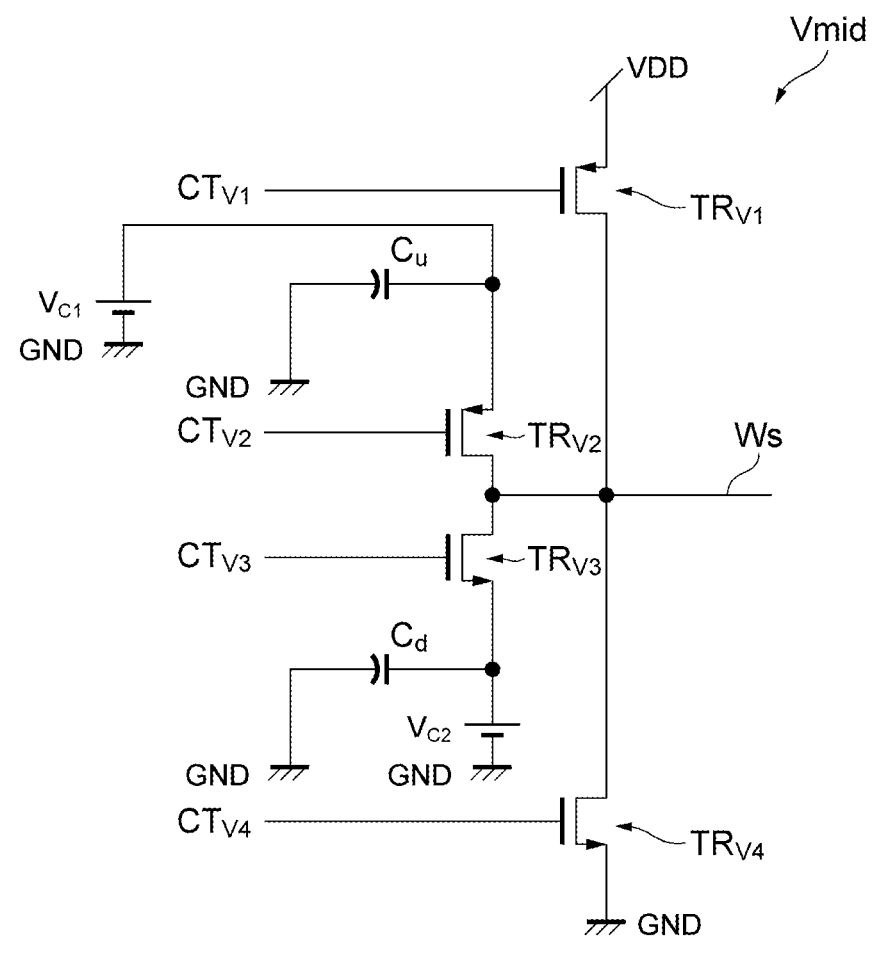
FIG. 14 is a diagram illustrating an example of a circuit configuration of a voltage source in a potential generation circuit according to the third embodiment of the present disclosure.

This completes the description of the circuit configuration of the output control circuit 155B. Next, an example of a configuration of a circuit of the voltage source Vmid will be described. FIG. 14 is a diagram illustrating an example of the circuit configuration of the voltage source Vmid according to the third embodiment of the present disclosure.

As illustrated in FIG. 14, the voltage source Vmid includes transistors TRv1, TRv2, TRv3, and TRv4, capacitive elements Cu and Cd, voltage sources Vc1 and Vc2, the power supply line VDD, and the reference line GND.

The transistor TRv1 is, for example, a P-type MOS transistor. The transistor TRv1 supplies the potential of the power supply line VDD connected to a source terminal to the short-circuit signal line Ws connected to a drain terminal, according to a control signal CTv1 input from the control circuit 12 to a gate terminal. Specifically, the transistor TRv1 supplies the potential of the power supply line VDD to the short-circuit signal line Ws when the control signal CTv1 is in the low state, and stops the supply of the potential of the power supply line VDD to the short-circuit signal line Ws when the control signal CTv1 is in the high state.

The transistor TRv2 is, for example, a P-type MOS transistor. The transistor TRv2 supplies the potential of the voltage source Vc1 connected to a source terminal to the short-circuit signal line Ws connected to a drain terminal, according to a control signal CTv2 input from the control circuit 12 to a gate terminal. Specifically, the transistor TRv2 supplies the potential of the voltage source Vc1 to the short-circuit signal line Ws when the control signal CTv2 is in the low state, and stops the supply of the potential of the voltage source Vc1 to the short-circuit signal line Ws when the control signal CTv2 is in the high state.

The transistor TRv3 is, for example, an N-type MOS transistor. The transistor TRv3 supplies the potential of the voltage source Vc2 connected to a source terminal to the short-circuit signal line Ws connected to a drain terminal, according to a control signal CTv3 input from the control circuit 12 to a gate terminal. Specifically, the transistor TRv3 supplies the potential of the voltage source Vc2 to the short-circuit signal line Ws when the control signal CTv3 is in the high state, and stops the supply of the potential of the voltage source Vc2 to the short-circuit signal line Ws when the control signal CTv3 is in the low state.

The voltage source Vc1 supplies the potential to the source terminal of the transistor TRv2 and the capacitive element Cu. The potential supplied by the voltage source Vc1 is, for example, two-thirds of the potential in the high level. One end of the voltage source Vc1 is connected to the source terminal of the transistor TRv2 and an anode of the capacitive element Cu, and another end of the voltage source Vc1 is connected to the reference line GND.

The voltage source Vc2 supplies the potential to the source terminal of the transistor TRv3 and the capacitive element Cd. The potential supplied by the voltage source Vc1 is, for example, one third of the potential in the high level. The one end of the voltage source Vc1 is connected to the source terminal of the transistor TRv3 and an anode of the capacitive element Cd, and the other end of the voltage source Vc1 is connected to the reference line GND.

The capacitive element Cu is, for example, an electrolytic capacitor, and the capacitive element Cu stabilizes the potential of the voltage source Vc1. The anode of the capacitive element Cu is connected to the source terminal of the transistor TRv2 and the voltage source Vc1, and a cathode of the capacitive element Cu is connected to the reference line GND.

The capacitive element Cd is, for example, an electrolytic capacitor, and the capacitive element Cd stabilizes the potential of the voltage source Vc2. The anode of the capacitive element Cd is connected to the source terminal of the transistor TRv3 and the voltage source Vc2, and a cathode of the capacitive element Cd is connected to the reference line GND.

The transistor TRv4 is, for example, an N-type MOS transistor. The transistor TRv4 discharges the electricity from the short-circuit signal line Ws connected to a drain terminal to the reference line GND connected to a source terminal, according to a control signal CTv4 input from the control circuit 12 to a gate terminal. Specifically, the transistor Trv4 discharges the electricity from the short-circuit signal line Ws to the reference line GND when the control signal CTv4 is in the high state, and stops the discharge of the electricity from the short-circuit signal line Ws to the reference line GND when the control signal CTv4 is in the low state.

The voltage source Vmid configured in this way switches the potential to four kinds of potentials including the potential in the high level, two thirds of the potential in the high level, one third of the potential in the high level, and the potential in the low level and supplies the potential to the short-circuit signal line Ws according to the control signals CTv1, CTv2, CTv3, and CTv4 output from the control circuit 12. Note that the potential supplied by the voltage sources Vc1 and Vc2 is not limited to the potential described above, and the potential may be, for example, one half of the potential in the high level.

Flow of a Series of Operations in Output Circuit

Figure 10A:
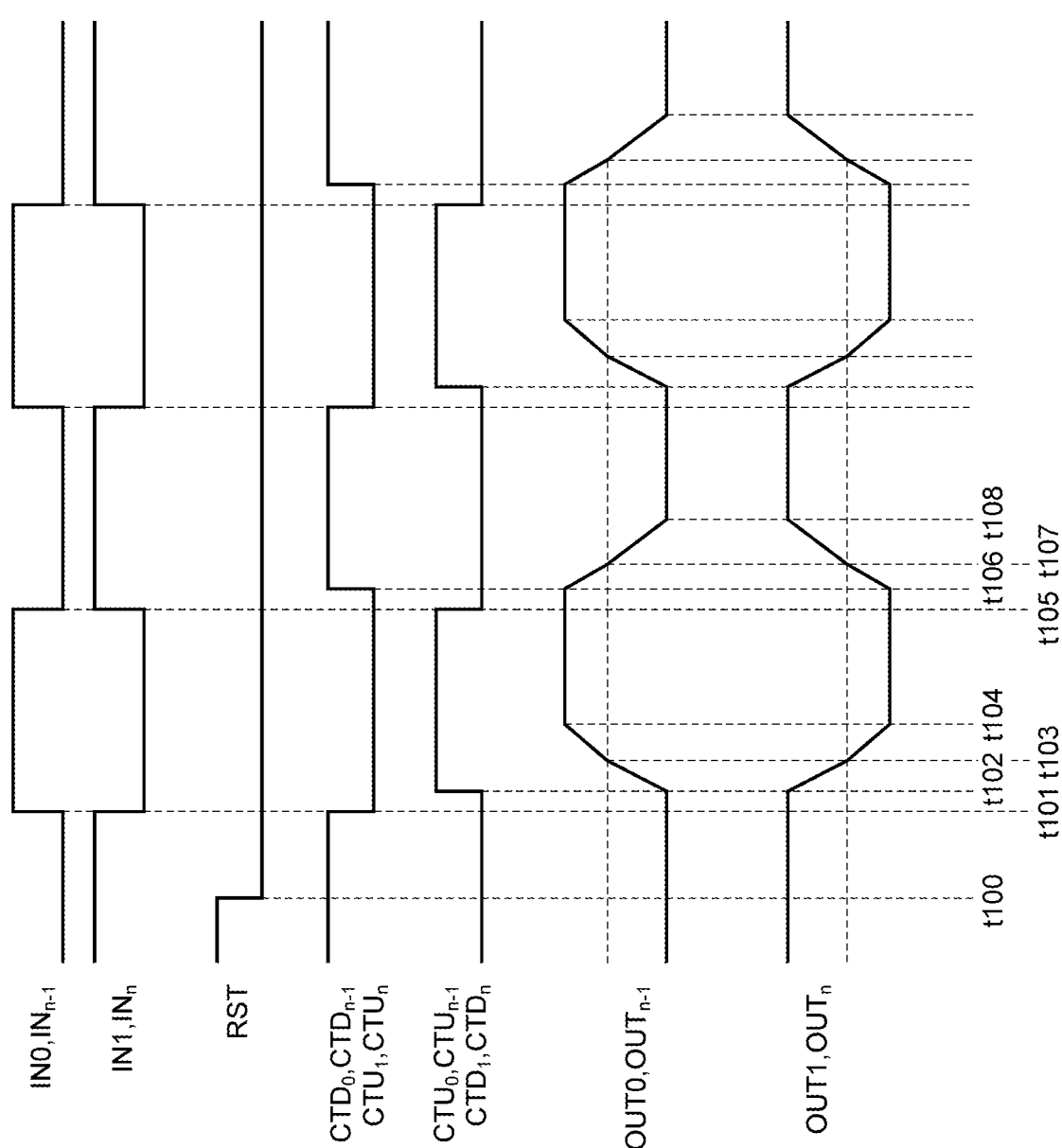
FIG. 10A is a timing chart illustrating an example of transition of a potential of each signal in the output circuit according to the third embodiment of the present disclosure.

This completes the description of the example of the circuit configuration of the voltage source Vmid. Next, the transition of the potential of each signal in the output circuit 15C will be described in detail. FIG. 10A is a timing chart illustrating the transition of the potential of each signal in the output circuit 15C according to the third embodiment of the present disclosure.

At time t100, the control circuit 12 switches the state of the reset signal RST to the low state to open both ends of the short-circuit control element SWr. This stops the supply of the initial potential from the reset voltage source Vrst to the short-circuit signal line Ws.

At time t101, the driver selection circuit 151 shifts the state of the input signals IN0 and INn−1 from the low state to the high state and shifts the state of the input signals IN1 and INn from the high state to the low state. The driver selection circuit 151 inputs the input signals IN0, IN1, INn−1, and INn to the corresponding transmission drivers 152B.

At time t101, the control circuit 12 shifts the state of control signals CTD0, CTDn−1, CTU1, and CTUn from the high state to the low state and outputs the control signals CTD0, CTDn−1, CTU1, and CTUn to short-circuit control elements SWD0, SWDn−1, SWU1, and SWUn to thereby open both ends of the short-circuit control elements SWD0, SWDn−1, SWU1, and SWUn.

At time t102 that is a timing at which a predetermined time has passed from time t101, the control circuit 12 shifts the state of the control signals CTU0, CTUn−1, CTD1, and CTDn from the low state to the high state and outputs the control signals CTU0, CTUn−1, CTD1, and CTDn to the short-circuit control elements SWU0, SWUn−1, SWD1, and SWDn to thereby short-circuit both ends of the short-circuit control elements SWU0, SWUn−1, SWD1, and SWDn.

As a result, at time t102, the charge is supplied from the output signal lines Wout corresponding to the transmission signals OTU1 and OUTn to the capacitive element Cext and the output signal lines Wout corresponding to the transmission signals OUT0 and OUTn−1 through the short-circuit signal line Ws, and the potential of each of the transmission signals OUT0, OUT1, OUTn−1, and OUTn starts to transition to the intermediate potential.

At time t103, the potential of each of the transmission signals OUT0, OUT1, OUTn−1, and OUTn reaches the intermediate potential. At time t103, the current control element DU electrically disconnects the current path in the second direction. In addition, at time t103, the current control element DD electrically disconnects the current path in the first direction. In addition, at time t103, the transmission drivers 152B corresponding to the transmission signals OUT0 and OUTn−1 supply the charge to the corresponding output signal lines Wout. As a result, at time t103, the potential of each of the transmission signals OUT0 and OUTn−1 starts to transition from the intermediate potential to the high level. In addition, at time t103, the transmission drivers 152B corresponding to the transmission signals OUT1 and OUTn discharge the electricity from the corresponding output signal lines Wout. As a result, the potential of each of the transmission signals OUT1 and OUTn starts to transition from the intermediate potential to the low level at time t103.

At time t104, the charge is supplied from the corresponding transmission drivers 152B, and the potential of each of the transmission signals OUT0 and OUTn−1 reaches the high level. In addition, at time t104, the electricity is discharged from the corresponding transmission drivers 152B, and the potential of each of the transmission signals OUT1 and OUTn reaches the low level.

At time t105, the control circuit 12 shifts the state of the control signals CTU0, CTUn−1, CTD1, and CTDn from the high state to the low state and outputs the control signals CTU0, CTUn−1, CTD1, and CTDn to the short-circuit control elements SWU0, SWUn−1, SWD1, and SWDn to thereby open both ends of the short-circuit control elements SWU0, SWUn−1, SWD1, and SWDn.

At time t106 that is a timing at which a predetermined time has passed from time t105, the control circuit 12 shifts the state of the control signals CTD0, CTDn−1, CTU1, and CTUn from the low state to the high state and outputs the control signals CTD0, CTDn−1, CTU1, and CTUn to the short-circuit control elements SWD0, SWDn−1, SWU1, and SWUn to thereby short-circuit both ends of the short-circuit control elements SWD0, SWDn−1, SWU1, and SWUn.

As a result, at time t106, the charge is supplied from the output signal lines Wout corresponding to the transmission signals OUT0 and OUTn−1 to the capacitive element Cext and the output signal lines Wout corresponding to the transmission signals OUT1 and OUTn through the short-circuit signal line Ws, and the potential of each of the transmission signals OUT0, OUT1, OUTn−1, and OUTn starts to transition to the intermediate potential.

At time t107, the potential of each of the transmission signals OUT0, OUT1, OUTn−1, and OUTn reaches the intermediate potential. At time t107, the current control element DU electrically disconnects the current path in the second direction. In addition, at time t107, the current control element DD electrically disconnects the current path in the first direction. In addition, at time t107, the transmission drivers 152B corresponding to the transmission signals OUT1 and OUTn supply the charge to the corresponding output signal lines Wout. As a result, at time t107, the potential of each of the transmission signals OUT1 and OUTn starts to transition from the intermediate potential to the high level. In addition, at time t107, the transmission drivers 152B corresponding to the transmission signals OUT0 and OUTn−1 discharge the electricity from the corresponding output signal lines Wout. As a result, the potential of each of the transmission signals OUT0 and OUTn−1 starts to transition from the intermediate potential to the low level at time t107.

At time t108, the charge is supplied from the corresponding transmission drivers 152B, and the potential of each of the transmission signals OUT1 and OUTn reaches the high level. In addition, at time t108, the electricity is discharged from the corresponding transmission drivers 152B, and the potential of each of the transmission signals OUT0 and OUTn−1 reaches the low level.

This completes the description of the transition of the potential of each signal in the output circuit 15C. Next, a flow of a series of operations in the output circuit 15C will be described detail. FIG. 16 is a flow chart illustrating the flow of the series of operations in the output circuit 15C according to the third embodiment of the present disclosure.

SP60

The transmission driver 152B amplifies the input signal IN input from the driver selection circuit 151 to a signal with the potential difference that allows transmission of the signal from the linear electrode 22. The transmission driver 152B sets the amplified signal as the transmission signal OUT and transmits the transmission signal OUT to the corresponding output signal line Wout. The process then moves to SP62.

SP62

The control circuit 12 determines whether or not the signal waveform of the transmission signal OUT rises from the low level to the high level at this timing. If the determination is affirmative, the process moves to SP64. On the other hand, if the determination is negative, the process moves to SP68.

SP64

The control circuit 12 controls both ends of each short-circuit control element SWD to open. The process then moves to SP66.

SP66

The control circuit 12 controls both ends of each short-circuit control element SWU to short-circuit. As a result, the potential is supplied from the output signal lines Wout with the potential in the high level to the capacitive element Cext and the output signal lines Wout with the potential in the low level through the short-circuit signal line Ws. The potential of each output signal line Wout and the short-circuit signal line Ws first transitions to the intermediate potential. The potential of each output signal line Wout then transitions from the intermediate potential to the high level.

SP68

The control circuit 12 determines whether or not the signal waveform of the transmission signal OUT falls from the high level to the low level at this timing. If the determination is affirmative, the process moves to SP70. On the other hand, if the determination is negative, the series of operations ends.

SP70

The control circuit 12 controls both ends of each short-circuit control element SWU to open. The process then moves to SP72.

SP72

The control circuit 12 controls both ends of each short-circuit control element SWD to short-circuit. As a result, the potential is supplied from the output signal lines Wout with the potential in the high level to the capacitive element Cext and the output signal lines Wout with the potential in the low level through the short-circuit signal line Ws. The potential of each output signal line Wout and the short-circuit signal line Ws first transitions to the intermediate potential. The potential of each output signal line Wout then transitions from the intermediate potential to the low level.

Effects

As described above, the sensor controller 10 in the present embodiment includes the control circuit 12 that transmits the control signals CTU and CTD, and the intermediate potential supply unit 153C includes the short-circuit signal line Ws, the plurality of first output control circuits 155A in which the one end of each is connected to the corresponding output signal line Wout and the other end of each is connected to the short-circuit signal line Ws, each of the plurality of first output control circuits 155A being electrically connected only in the first direction from the corresponding output signal line Wout to the short-circuit signal line Ws according to the control signal CTD, and the plurality of second output control circuits 156A in which the one end of each is connected to the corresponding output signal line Wout and the other end of each is connected to the short-circuit signal line Ws, each of the plurality of second output control circuits 156A being electrically connected only in the second direction from the corresponding short-circuit signal line Ws to the output signal line Wout according to the control signal CTU.

According to this configuration, the output control circuit 155A electrically disconnects the current path in the first direction at the timing at which the potential of the short-circuit signal line Ws exceeds the potential of the corresponding output signal line Wout. In addition, the output control circuit 156A electrically disconnects the current path in the second direction at the timing at which the potential of the corresponding output signal line Wout exceeds the potential of the short-circuit signal line Ws. Therefore, according to the present invention, the sensor controller 10 supplies the intermediate potential from the intermediate potential supply unit 153C to the output signal line Wout only in the necessary period. Therefore, the sensor controller 10 can suppress the through current and reduce the power consumption more than in the conventional configuration.

Further, the control circuit 12 in the present embodiment controls each of the first output control circuits 155A to be electrically connected only in the second direction at the timing at which the potential of the corresponding output signal line Wout falls and to be electrically disconnected at the timing at which the potential of the corresponding output signal line Wout rises. In addition, the control circuit 12 controls each of the second output control circuits 156A to be electrically connected only in the first direction at the timing at which the potential of the corresponding output signal line Wout rises and to be electrically disconnected at the timing at which the potential of the corresponding output signal line Wout falls.

According to this configuration, the sensor controller 10 supplies the intermediate potential from the intermediate potential supply unit 153C to the output signal line Wout only in the necessary period. Therefore, the sensor controller 10 can suppress the through current and reduce the power consumption more than in the conventional configuration.

Further, the sensor controller 10 in the present embodiment includes the plurality of transmission drivers 152B that generate the signal waveforms transitioning between the first potential (low level) and the second potential (high level) and that output the signal waveforms as the transmission signals OUT, the plurality of output signal lines Wout for outputting the transmission signals OUT output from the corresponding transmission drivers 152B, to the corresponding linear electrodes 22, and the intermediate potential supply unit 153C that generates the intermediate potential between the first potential and the second potential, supplies the intermediate potential to at least one output signal line Wout in the period from the time point (time t102 and time t105) at which the potential of the signal waveform starts to transition from the first potential to the second potential or from the second potential to the first potential to the time point at which the potential of the output signal line Wout reaches the intermediate potential, and stops the supply of the intermediate potential at the timing (time t103 and time t106) at which the potential of the output signal line Wout reaches the intermediate potential.

According to this configuration, the sensor controller 10 supplies the intermediate potential from the intermediate potential supply unit 153C to the output signal line Wout only in the necessary period. Therefore, the sensor controller 10 can suppress the through current and reduce the power consumption more than in the conventional configuration.

Further, the intermediate potential supply unit 153C in the present embodiment includes the plurality of first output control circuits 155A that discharge the electricity from the corresponding transmission drivers 152B at the timing (time t102 and time t105) at which the potentials of the signal waveforms of the corresponding transmission drivers 152B fall, and the plurality of second output control circuits 156A that supply the intermediate potential to the corresponding transmission drivers 152B at the timing (time t102 and time t105) at which the potentials of the signal waveforms of the corresponding transmission drivers 152B rise.

According to this configuration, the sensor controller 10 supplies the intermediate potential from the intermediate potential supply unit 153C to the output signal line Wout only in the necessary period. Therefore, the sensor controller 10 can suppress the through current and reduce the power consumption more than in the conventional configuration.

Further, the intermediate potential supply unit 153C in the present embodiment includes the potential generation circuit 154A including the voltage source Vmid or the capacitive element Cext separate from the transmission drivers 152B, and the intermediate potential supply unit 153C outputs the voltage from the potential generation circuit 154A in the period from the time point (time t102 and time t105) of the start of the transition from the first potential to the second potential or the transition from the second potential to the first potential to the time point at which the potential of the output signal line Wout reaches the intermediate potential, to thereby supply the intermediate potential to the output signal line Wout.

According to this configuration, the sensor controller 10 can supply, to the output signal lines Wout, the intermediate potential from the intermediate potential supply unit 153C including the potential generation circuit 154A including the voltage source Vmid or the capacitive element Cext separate from the transmission drivers 152B, to thereby stably supply the intermediate potential to the output signal line Wout at a necessary timing. Therefore, according to the present invention, the sensor controller 10 can suppress the through current and reduce the power consumption more than in the conventional configuration.

Fourth Embodiment of the Present Disclosure

This completes the description of the third embodiment of the present disclosure. Next, a fourth embodiment of the present disclosure will be described.
Circuit Configuration FIG. 12 is a diagram illustrating an example of a circuit configuration of an output circuit 15D including an intermediate potential supply unit 153D according to the fourth embodiment of the present disclosure.

Figure 12:
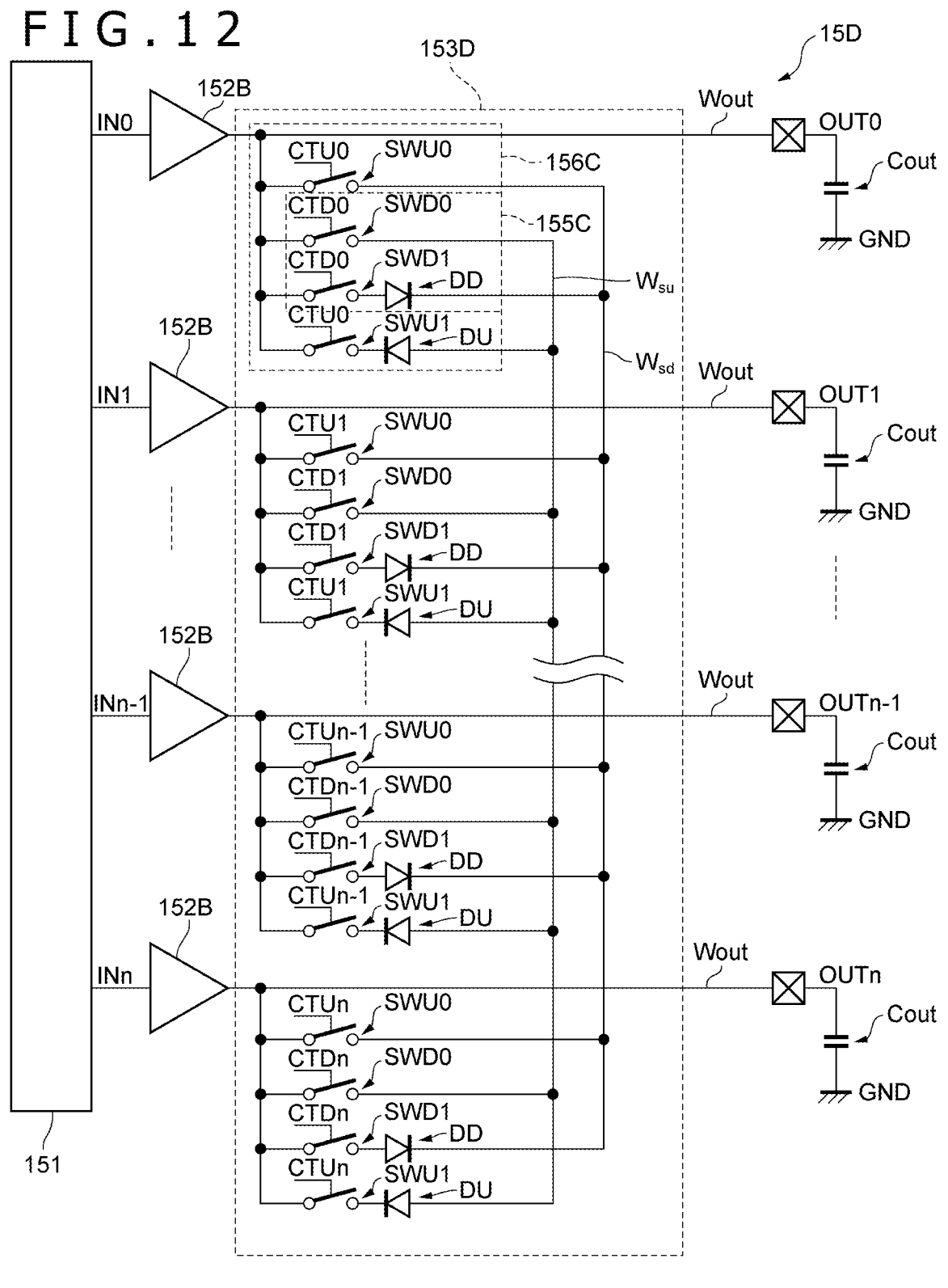
FIG. 12 is a diagram illustrating an example of a circuit configuration of an output circuit including an intermediate potential supply unit according to a fourth embodiment of the present disclosure.

As illustrated in FIG. 12, the output circuit 15D includes the driver selection circuit 151, the plurality of transmission drivers 152B, and the intermediate potential supply unit 153D. Note that, in FIG. 12, it is assumed that the driver selection circuit 151 selects n+1 transmission drivers 152B. In addition, it is assumed that the linear electrode 22 includes the capacitive element Cout as a load capacitance. The capacitance of the capacitive element Cout is, for example, approximately 1200 pF. Note that the driver selection circuit 151 and the transmission drivers 152B are similar to those of the third embodiment of the present disclosure, and the description will not be repeated.

The intermediate potential supply unit 153D includes, for example, a plurality of output control circuits 155C and 156C provided for each transmission driver 152, and the short-circuit signal lines Wsu and Wsd.

The output control circuit 155C includes, for example, short-circuit control elements SWD0 and SWD1 and the current control element DD. One output control circuit 155 is provided for each corresponding transmission driver 152B, and the output control circuit 155 supplies the potential of the corresponding output signal line Wout to the short-circuit signal lines Wsu and Wsd according to the control signal CTD output from the control circuit 12 to each corresponding transmission driver 152B. Specifically, the output control circuit 155C supplies the potential of the corresponding output signal line Wout to the short-circuit signal lines Wsu and Wsd when the state of the control signal CTD is the high state, and stops the supply of the potential from the corresponding output signal line Wout to the short-circuit signal lines Wsu and Wsd when the state of the control signal CTD is the low state.

The short-circuit control element SWD0 is, for example, a transistor or a switch element. One end of the short-circuit control element SWD0 is connected to the corresponding output signal line Wout, and another end of the short-circuit control element SWD0 is connected to the short-circuit signal line Wsu. The short-circuit control element SWD0 short-circuits or opens both ends of the short-circuit control element SWD0 according to the control signal CTD output from the control circuit 12. Specifically, the short-circuit control element SWD0 short-circuits both ends of the short-circuit control element SWD0 when the state of the control signal CTD is the high state, and opens both ends of the short-circuit control element SWD0 when the state of the control signal CTD is the low state.

The short-circuit control element SWD1 is, for example, a transistor or a switch element. One end of the short-circuit control element SWD1 is connected to the corresponding output signal line Wout, and another end of the short-circuit control element SWD1 is connected to the anode terminal of the current control element DD. The short-circuit control element SWD1 short-circuits or opens both ends of the short-circuit control element SWD1 according to the control signal CTD output from the control circuit 12. Specifically, the short-circuit control element SWD1 short-circuits both ends of the short-circuit control element SWD1 when the state of the control signal CTD is the high state, and opens both ends of the short-circuit control element SWD1 when the state of the control signal CTD is the low state. Note that the short-circuit control element SWD1 and the current control element DD form a first current control circuit.

The current control element DD is, for example, a diode. The anode terminal of the current control element DD is connected to the short-circuit control element SWD1, and the cathode terminal of the current control element DD is connected to the short-circuit signal line Wsd. The current control element DD electrically connects a current path in the direction from the short-circuit control element SWD1 to the short-circuit signal line Wsd and electrically disconnects a current path in the direction from the short-circuit signal line Wsd to the short-circuit control element SWD1. Note that the current control element DD and the short-circuit control element SWD1 form the first current control circuit.

The output control circuit 156C includes, for example, the short-circuit control elements SWU0 and SWU1 and the current control element DU. One output control circuit 156C is provided for each corresponding transmission driver 152B, and the output control circuit 156C supplies the potential of each of the short-circuit signal lines Wsu and Wsd to the corresponding output signal line Wout according to the control signal CTU output from the control circuit 12 to each corresponding transmission driver 152B. Specifically, the output control circuit 156C supplies the potential of each of the short-circuit signal lines Wsu and Wsd to the corresponding output signal line Wout when the state of the control signal CTU is the high state, and stops the supply of the potential from the short-circuit signal lines Wsu and Wsd to the corresponding output signal line Wout when the state of the control signal CTU is the low state.

The short-circuit control element SWU0 is, for example, a transistor or a switch element. One end of the short-circuit control element SWU0 is connected to the corresponding output signal line Wout, and another end of the short-circuit control element SWU0 is connected to the short-circuit signal line Wsd. The short-circuit control element SWU0 short-circuits or opens both ends of the short-circuit control element SWU0 according to the control signal CTU output from the control circuit 12. Specifically, the short-circuit control element SWU0 short-circuits both ends of the short-circuit control element SWU0 when the state of the control signal CTU is the high state, and opens both ends of the short-circuit control element SWU0 when the state of the control signal CTU is the low state.

The short-circuit control element SWU1 is, for example, a transistor or a switch element. One end of the short-circuit control element SWU1 is connected to the corresponding output signal line Wout, and another end of the short-circuit control element SWU1 is connected to the cathode terminal of the current control element DU. The short-circuit control element SWU1 short-circuits or opens both ends of the short-circuit control element SWU1 according to the control signal CTU output from the control circuit 12. Specifically, the short-circuit control element SWU1 short-circuits both ends of the short-circuit control element SWU1 when the state of the control signal CTU is the high state, and opens both ends of the short-circuit control element SWU1 when the state of the control signal CTU is the low state. Note that the short-circuit control element SWU1 and the current control element DU form a second current control circuit.

The current control element DU is, for example, a diode. The anode terminal of the current control element DU is connected to the short-circuit signal line Wsu, and the cathode terminal of the current control element DU is connected to the short-circuit control element SWU1. The current control element DU electrically connects a current path in a direction from the short-circuit signal line Wsu to the short-circuit control element SWU and electrically disconnects a current path in a direction from the short-circuit control element SWU1 to the short-circuit signal line Wsu. Note that the current control element DU and the short-circuit control element SWU1 form the second current control circuit.

In the output circuit 15D configured in this way, the control circuit 12 controls the corresponding short-circuit control elements SWU0 and SWU1 to the short-circuit state at the timing at which the state of one of the input signals IN0 to INn transitions from the low state to the high state. In addition, the control circuit 12 controls the corresponding short-circuit control elements SWD0 and SWD1 to the short-circuit state at the timing at which the state of one of the input signals IN0 to INn transitions from the high state to the low state. As a result, the output signal lines Wout with the potential in the high level and the short-circuit signal line Wsu are short-circuited, and the output signal lines Wout with the potential in the low level and the short-circuit signal line Wsd are short-circuited. In addition, a current path in a direction from the output signal line Wout with the potential in the high level to the short-circuit signal line Wsd is electrically connected, and a current path in a direction from the short-circuit signal line Wsu to the output signal line Wout with the potential in the low level is electrically connected. Therefore, the charge is supplied from the output signal lines Wout with the potential in the high level to the output signal lines Wout with the potential in the low level through the short-circuit signal lines Wsu and Wsd. As a result, the potentials of each output signal line Wout and the short-circuit signal lines Wsu and Wsd reach the intermediate potential.

Next, the current control element DU electrically disconnects the current path in the direction from the short-circuit signal line Wsu to the corresponding output signal line Wout at the timing at which the potential of the short-circuit signal line Wsu falls below the potential of the corresponding output signal line Wout. In addition, the current control element DD electrically disconnects the current path in the direction from the corresponding output signal line Wout to the short-circuit signal line Wsd at the timing at which the potential of the corresponding output signal line Wout falls below the potential of the short-circuit signal line Wsd. As a result, the corresponding transmission driver 152B shifts the potential of each output signal line Wout from the intermediate potential to the high level or the low level, and the transmission signals OUT0, OUT1, OUTn−1, and OUTn are transmitted through the linear electrodes 22.

This completes the description of the configuration of the output circuit 15D. Note that the transition of the potential of each signal and the flow of the series of operations in the output circuit 15D are similar to those in the output circuit 15C, and the description will not be repeated.

Effects

As described above, the sensor controller 10 in the present embodiment includes the control circuit 12 that transmits the control signals CTU and CTD. The intermediate potential supply unit 153D includes the first short-circuit signal line Wsu and the second short-circuit signal line Wsd. The first output control circuit 155C includes the first short-circuit control element SWD0 in which both ends are short-circuited or opened according to the control signal CTD, the one end is connected to the corresponding output signal line Wout, and the other end is connected to the first short-circuit signal line Wsu, and the first current control circuit which is electrically connected or electrically disconnected according to the control signal CTD and in which the one end is connected to the corresponding output signal line Wout and the other end is connected to the second short-circuit signal line Wsd, the first current control circuit being electrically connected only in the direction from the corresponding output signal line Wout to the second short-circuit signal line Wsd. The second output control circuit 156C includes the second short-circuit control element SWU0 in which both ends are short-circuited or opened according to the control signal CTU, the one end is connected to the corresponding output signal line Wout, and the other end is connected to the second short-circuit signal line Wsd, and the second current control circuit in which both ends are electrically connected or electrically disconnected according to the control signal CTU, the one end is connected to the corresponding output signal line Wout, and the other end is connected to the first short-circuit signal line Wsu, the second current control circuit being electrically connected only in the direction from the first short-circuit signal line Wsu to the corresponding output signal line Wout.

According to this configuration, the output control circuit 155C electrically disconnects the current path in the first direction at the timing at which the potential of each of the short-circuit signal lines Wsu and Wsd exceeds the potential of the corresponding output signal line Wout. In addition, the output control circuit 156C electrically disconnects the current path in the second direction at the timing at which the potential of the corresponding output signal line Wout exceeds the potential of each of the short-circuit signal lines Wsu and Wsd. Therefore, according to the present invention, the sensor controller 10 supplies the intermediate potential from the intermediate potential supply unit 153D to the output signal lines Wout only in the necessary period. Therefore, the sensor controller 10 can suppress the through current and reduce the power consumption more than in the conventional configuration.

Fifth Embodiment of the Present Disclosure

This completes the description of the fourth embodiment of the present disclosure. Next, a fifth embodiment of the present disclosure will be described.
Circuit Configuration FIG. 13 is a diagram illustrating an example of a circuit configuration of an output circuit 15E including an intermediate potential supply unit 153E according to the fifth embodiment of the present disclosure.

Figure 13:
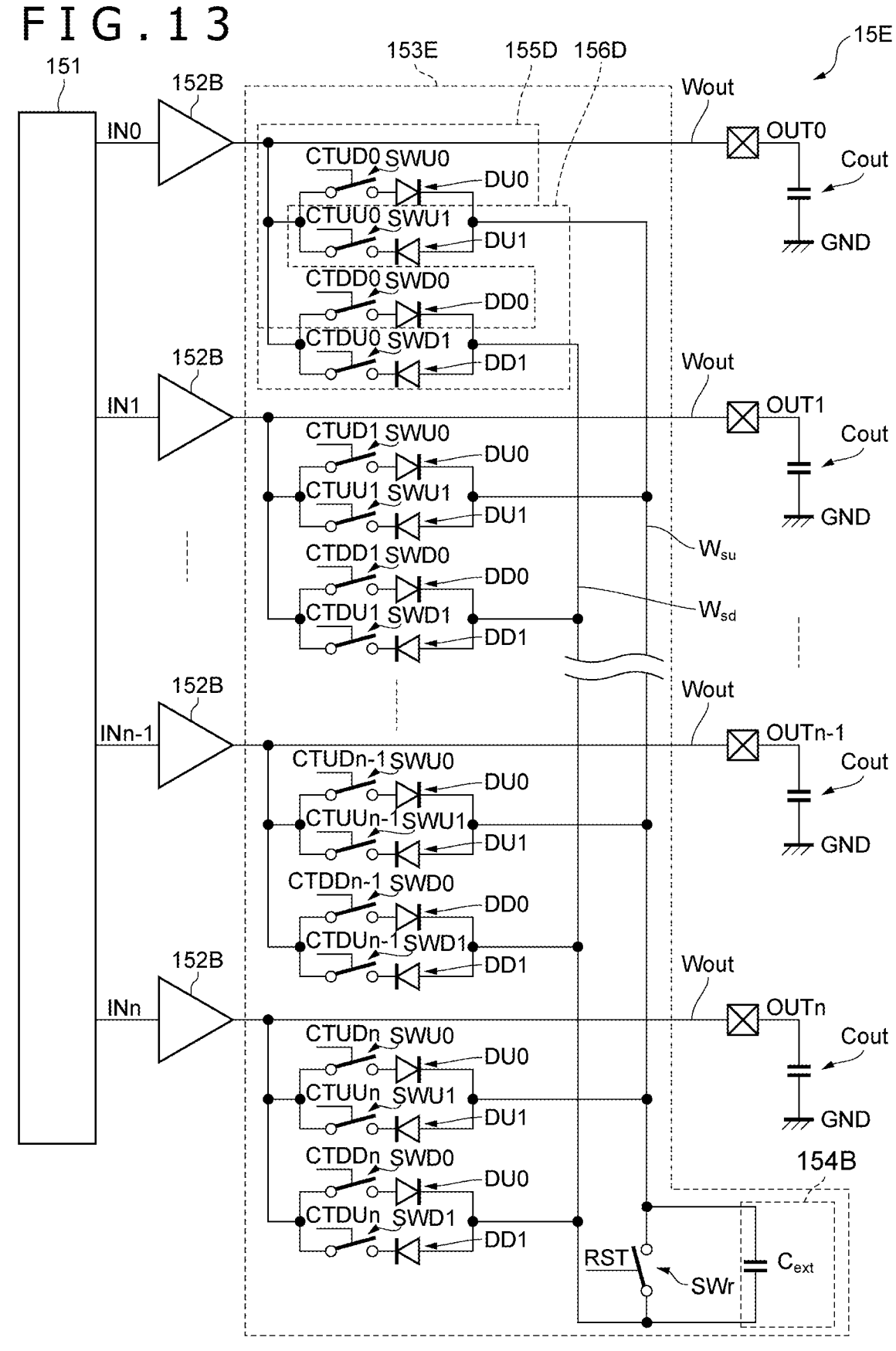
FIG. 13 is a diagram illustrating an example of a circuit configuration of an output circuit including an intermediate potential supply unit according to the fifth embodiment of the present disclosure.

As illustrated in FIG. 13, the output circuit 15E includes the driver selection circuit 151, the plurality of transmission drivers 152B, and the intermediate potential supply unit 153E. Note that, in FIG. 13, it is assumed that the driver selection circuit 151 selects n+1 transmission drivers 152B. In addition, it is assumed that the linear electrode 22 includes the capacitive element Cout as a load capacitance. The capacitance of the capacitive element Cout is, for example, approximately 1200 pF. Note that the driver selection circuit 151 and the transmission drivers 152B are similar to those of the third embodiment of the present disclosure, and the description will not be repeated.

The intermediate potential supply unit 153E includes the potential generation circuit 154B, a plurality of output control circuits 155D and 156D, the short-circuit signal lines Wsu and Wsd, and the short-circuit control element SWr. Note that the potential generation circuit 154B and the short-circuit control element SWr are similar to those described above, and the description will not be repeated.

The output control circuit 155D includes, for example, the short-circuit control elements SWU0 and SWD0 and current control elements DU0 and DD0. One output control circuit 155D is provided for each corresponding transmission driver 152B, and the output control circuit 155D supplies the potential of the corresponding output signal line Wout to the short-circuit signal lines Wsu and Wsd according to control signals CTUD and CTDD output from the control circuit 12 to each corresponding transmission driver 152B. Specifically, the output control circuit 155D supplies the potential of the corresponding output signal line Wout to the short-circuit signal line Wsu when the state of the control signal CTUD is the high state, and stops the supply of the potential from the corresponding output signal line Wout to the short-circuit signal line Wsu when the state of the control signal CTUD is the low state. In addition, the output control circuit 155D supplies the potential of the corresponding output signal line Wout to the short-circuit signal line Wsd when the state of the control signal CTDD is the high state, and stops the supply of the potential from the corresponding output signal line Wout to the short-circuit signal line Wsd when the state of the control signal CTDD is the low state.

The short-circuit control element SWU0 is, for example, a transistor or a switch element. The one end of the short-circuit control element SWU0 is connected to the corresponding output signal line Wout, and the other end of the short-circuit control element SWU0 is connected to an anode terminal of the current control element DU0. The short-circuit control element SWD0 short-circuits or opens both ends of the short-circuit control element SWD0 according to the control signal CTUD output from the control circuit 12 to each corresponding transmission driver 152B. Specifically, the short-circuit control element SWU0 short-circuits both ends of the short-circuit control element SWU0 when the state of the control signal CTUD is the high state, and opens both ends of the short-circuit control element SWU0 when the state of the control signal CTUD is the low state. Note that the short-circuit control element SWU0 and the current control element DU0 form a third current control circuit.

The current control element DU0 is, for example, a diode. An anode terminal of the current control element DU0 is connected to the short-circuit control element SWU0, and a cathode terminal of the current control element DU0 is connected to the short-circuit signal line Wsu. The current control element DU0 electrically connects a current path in a direction from the short-circuit control element SWU0 to the short-circuit signal line Wsu and electrically disconnects a current path in a direction from the short-circuit signal line Wsu to the short-circuit control element SWU0. Note that the current control element DU0 and the short-circuit control element SWU0 form the third current control circuit.

The short-circuit control element SWD0 is, for example, a transistor or a switch element. The one end of the short-circuit control element SWD0 is connected to the corresponding output signal line Wout, and the other end of the short-circuit control element SWD0 is connected to the anode terminal of the current control element DD0. The short-circuit control element SWD0 short-circuits or opens both ends of the short-circuit control element SWD0 according to the control signal CTDD output from the control circuit 12 to each corresponding transmission driver 152B. Specifically, the short-circuit control element SWD0 short-circuits both ends of the short-circuit control element SWD0 when the state of the control signal CTDD is the high state, and opens both ends of the short-circuit control element SWD0 when the state of the control signal CTDD is the low state. Note that the short-circuit control element SWD0 and the current control element DD0 form a fourth current control circuit.

The current control element DD0 is, for example, a diode. The anode terminal of the current control element DD0 is connected to the short-circuit control element SWD0, and a cathode terminal of the current control element DD0 is connected to the short-circuit signal line Wsd. The current control element DD0 electrically connects a current path in a direction from the short-circuit control element SWD0 to the short-circuit signal line Wsd and electrically disconnects a current path in a direction from the short-circuit signal line Wsd to the short-circuit control element SWD0. Note that the current control element DD0 and the short-circuit control element SWD0 form the fourth current control circuit.

The output control circuit 156D includes, for example, the short-circuit control elements SWU1 and SWD1 and current control elements DUI and DD1. One output control circuit 156D is provided for each corresponding transmission driver 152B, and the output control circuit 156D supplies the potential of each of the short-circuit signal lines Wsu and Wsd to the corresponding output signal line Wout according to control signals CTUU and CTDU output from the control circuit 12 to each corresponding transmission driver 152B. Specifically, the output control circuit 156D supplies the potential of the short-circuit signal line Wsu to the corresponding output signal line Wout when the state of the control signal CTUU is the high state, and stops the supply of the potential from the short-circuit signal line Wsu to the corresponding output signal line Wout when the state of the control signal CTUU is the low state. In addition, the output control circuit 156D supplies the potential of the short-circuit signal line Wsd to the corresponding output signal line Wout when the state of the control signal CTDU is the high state, and stops the supply of the potential from the short-circuit signal line Wsd to the corresponding output signal line Wout when the state of the control signal CTDU is the low state.

The short-circuit control element SWU1 is, for example, a transistor or a switch element. The one end of the short-circuit control element SWU1 is connected to the corresponding output signal line Wout, and the other end of the short-circuit control element SWU1 is connected to a cathode terminal of the current control element DUI. The short-circuit control element SWU1 short-circuits or opens both ends of the short-circuit control element SWU1 according to the control signal CTUU output from the control circuit 12 to each corresponding transmission driver 152B. Specifically, the short-circuit control element SWU1 short-circuits both ends of the short-circuit control element SWU1 when the state of the control signal CTUU is the high state, and opens both ends of the short-circuit control element SWU1 when the state of the control signal CTUU is the low state. Note that the short-circuit control element SWU1 and the current control element DUI form a fifth current control circuit.

The current control element DUI is, for example, a diode. An anode terminal of the current control element DUI is connected to the short-circuit signal line Wsu, and the cathode terminal of the current control element DUI is connected to the short-circuit control element SWU1. The current control element DU0 electrically connects a current path in a direction from the short-circuit signal line Wsu to the short-circuit control element SWU1 and electrically disconnects a current path in a direction from the short-circuit control element SWU1 to the short-circuit signal line Wsu. Note that the current control element DUI and the short-circuit control element SWU1 form the fifth current control circuit.

The short-circuit control element SWD1 is, for example, a transistor or a switch element. The one end of the short-circuit control element SWD1 is connected to the corresponding output signal line Wout, and the other end of short-circuit control element SWD1 is connected to a cathode terminal of the current control element DD1. The short-circuit control element SWD1 short-circuits or opens both ends of the short-circuit control element SWD1 according to the control signal CTDU output from the control circuit 12 to each corresponding transmission driver 152B. Specifically, the short-circuit control element SWD1 short-circuits both ends of the short-circuit control element SWD1 when the state of the control signal CTDU is the high state, and opens both ends of the short-circuit control element SWD1 when the state of the control signal CTDU is the low state. Note that the short-circuit control element SWD1 and the current control element DD1 form a sixth current control circuit.

The current control element DD1 is, for example, a diode. An anode terminal of the current control element DD1 is connected to the short-circuit signal line Wsu, and the cathode terminal of the current control element DD1 is connected to the short-circuit control element SWD1. The current control element DD1 electrically connects a current path in a direction from the short-circuit signal line Wsd to the short-circuit control element SWD1 and electrically disconnects a current path in a direction from the short-circuit control element SWD1 to the short-circuit signal line Wsd. Note that the current control element DD1 and the short-circuit control element SWD1 form the sixth current control circuit.

In the output circuit 15E configured in this way, the control circuit 12 allocates a value corresponding to a code (for example, orthogonal code) to each transmission driver 152B and determines to which one of the short-circuit signal lines Wsu and Wsd the corresponding output signal line Wout is to be connected. Specifically, the control circuit 12 determines to connect an output signal line Wout to the short-circuit signal line Wsu when the value of the orthogonal code corresponding to the output signal line Wout is "0," and determines to connect an output signal line Wout to the short-circuit signal line Wsd when the value of the orthogonal code corresponding to the output signal line Wout is "1," for example. Note that it is desirable that the number of values "0" and the number of values "1" included in the codes for determining the values allocated to the transmission drivers 152B be approximately the same.

At the timing at which the state of one of the input signals IN0 to INn transitions from the high state to the low state, the control circuit 12 controls, to the short-circuit state, the short-circuit control element SWU0 corresponding to the output signal line Wout determined to be connected to the short-circuit signal line Wsu and controls, to the short-circuit state, the short-circuit control element SWD0 corresponding to the output signal line Wout determined to be connected to the short-circuit signal line Wsd. Therefore, the direction from the output signal line Wout determined to be connected to the short-circuit signal line Wsu to the short-circuit signal line Wsu and the direction from the output signal line Wout determined to be connected to the short-circuit signal line Wsd to the short-circuit signal line Wsd are electrically connected. As a result, the charge is supplied from the corresponding output signal line Wout to the one end of the capacitive element Cext through the short-circuit signal line Wsu, and the charge is supplied from the corresponding output signal line Wout to the other end of the capacitive element Cext through the short-circuit signal line Wsd. The potentials of the output signal lines Wout, the potentials of the short-circuit signal lines Wsu and Wsd, and the potentials of both ends of the capacitive element Cext reach the intermediate potential.

Next, the control circuit 12 controls the short-circuit control elements SWU0 and SWD0 to the open state at the timing at which the potential of each output signal line Wout, the short-circuit signal lines Wsu and Wsd, and both ends of the capacitive element Cext reaches the intermediate potential. As a result, the corresponding transmission driver 152B shifts the potential of each output signal line Wout to the low level, and the transmission signals OUT0, OUT1, OUTn−1, and OUTn are transmitted through the linear electrodes 22.

On the other hand, at the timing at which the state of one of the input signals IN0 to INn transitions from the low state to the high state, the control circuit 12 controls, to the short-circuit state, the short-circuit control element SWU1 corresponding to the output signal line Wout determined to be connected to the short-circuit signal line Wsu and controls, to the short-circuit state, the short-circuit control element SWD1 corresponding to the output signal line Wout determined to be connected to the short-circuit signal line Wsd. Therefore, the direction from the short-circuit signal line Wsu to the output signal line Wout determined to be connected to the short-circuit signal line Wsu and the direction from the short-circuit signal line Wsd to the output signal line Wout determined to be connected to the short-circuit signal line Wsd are electrically connected. As a result, the charge is supplied from the one end of the capacitive element Cext to the corresponding output signal line Wout through the short-circuit signal line Wsu, and the charge is supplied from the other end of the capacitive element Cext to the corresponding output signal line Wout through the short-circuit signal line Wsd. The potential of the output signal line Wout, the potentials of the short-circuit signal lines Wsu and Wsd, and the potentials of both ends of the capacitive element Cext reach the intermediate potential.

Next, the control circuit 12 controls the short-circuit control elements SWU1 and SWD1 to the open state at the timing at which the potential of each output signal line Wout, the short-circuit signal lines Wsu and Wsd, and both ends of the capacitive element Cext reaches the intermediate potential. As a result, the corresponding transmission driver 152B shifts the potential of each output signal line Wout to the high level, and the transmission signals OUT0, OUT1, OUTn−1, and OUTn are transmitted through the linear electrodes 22.

Flow of a Series of Operations in Output Circuit

Figure 10B:
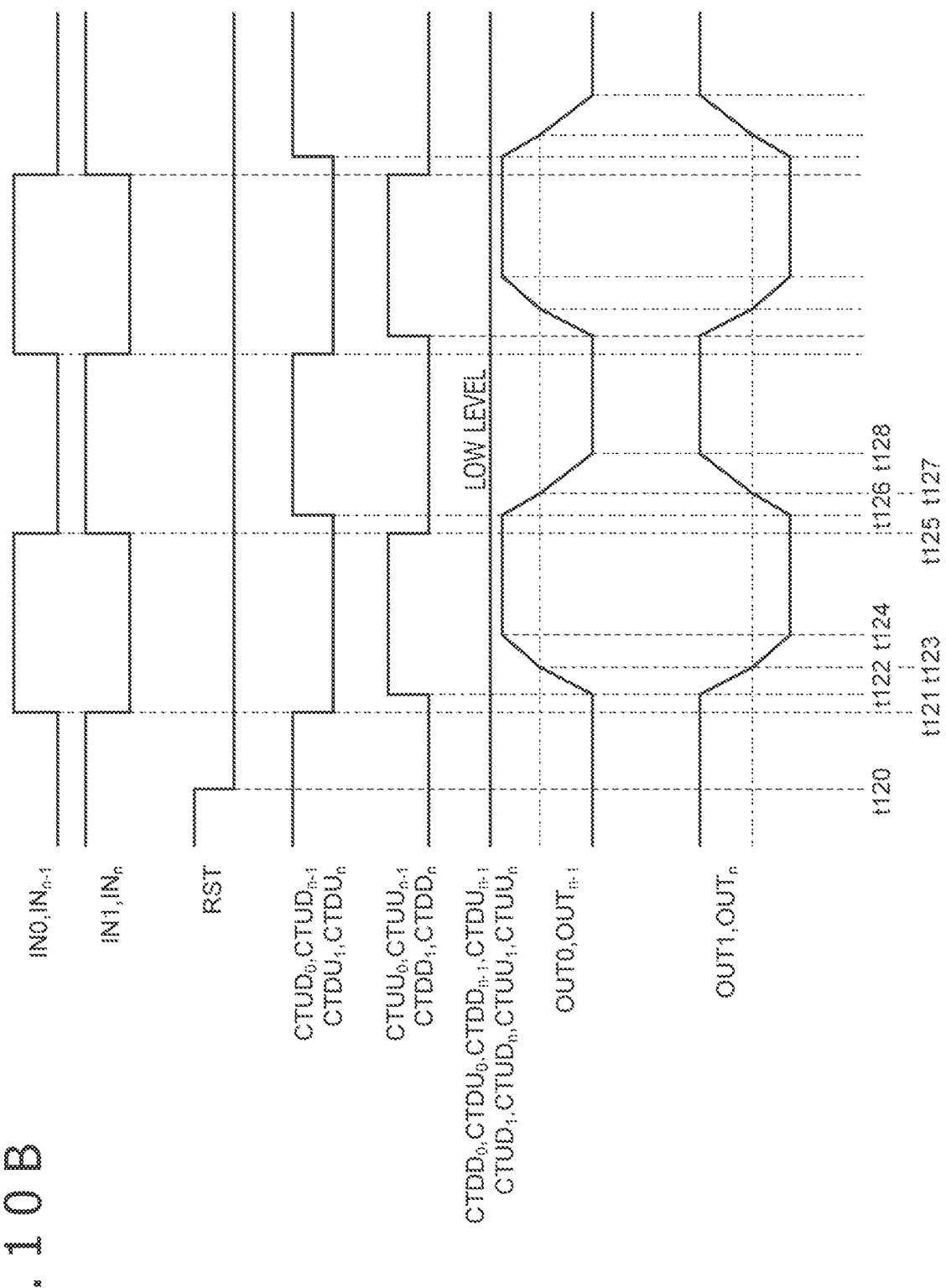
FIG. 10B is a timing chart illustrating transition of a potential of each signal in an output circuit according to a fifth embodiment of the present disclosure.

This completes the description of the configuration of the output circuit 15E. Next, the transition of the potential of each signal in the output circuit 15E will be described in detail. FIG. 10B is a timing chart illustrating the transition of the potential of each signal in the output circuit 15E according to the fifth embodiment of the present disclosure. Note that, in FIG. 10B, it is assumed that the control circuit 12 determines to connect the output signal lines Wout corresponding to the transmission signals OUT0 and OUTn−1 to the short-circuit signal line Wsu and connect the output signal lines Wout corresponding to the transmission signals OUT1 and OUTn to the short-circuit signal line Wsd.

At time t120, the control circuit 12 switches the state of the reset signal RST to the low state to open both ends of the short-circuit control element SWr. As a result, both ends of the capacitive element Cext open.

At time t121, the driver selection circuit 151 shifts the state of the input signals IN0 and INn−1 from the low state to the high state and shifts the state of the input signals IN1 and INn from the high state to the low state. The driver selection circuit 151 inputs the input signals IN0, IN1, INn−1, and INn to the corresponding transmission drivers 152B.

At time t121, the control circuit 12 shifts the state of control signals CTUD0, CTUDn−1, CTDU1, and CTDUn from the high state to the low state and outputs the control signals CTUD0, CTUDn−1, CTDU1, and CTDUn to the corresponding short-circuit control elements SWU0 and SWD1 to thereby open both ends of the short-circuit control elements SWU0 and SWD1.

At time t122 that is a timing at which a predetermined time has passed from time t121, the control circuit 12 shifts the state of control signals CTUU0, CTUUn−1, CTDD1, and CTDDn from the low state to the high state and outputs the control signals CTUU0, CTUUn−1, CTDD1, and CTDDn to the corresponding short-circuit control elements SWU1 and SWD0 to thereby short-circuit both ends of the corresponding short-circuit control elements SWU1 and SWD0.

As a result, at time t122, the charge is supplied from the output signal lines Wout corresponding to the transmission signals OUT1 and OUTn to the other end of the capacitive element Cext through the short-circuit signal line Wsu, and the charge is supplied from the one end of the capacitive element Cext to the output signal lines Wout corresponding to the transmission signals OUT0 and OUTn−1 through the short-circuit signal line Wsd. As a result, the potential of each of the transmission signals OUT0, OUT1, OUTn−1, and OUTn starts to transition to the intermediate potential.

At time t123, the potential of each of the transmission signals OUT0, OUT1, OUTn−1, and OUTn reaches the intermediate potential. As a result, the current control elements DUI and DD0 are electrically disconnected at time t123. In addition, at time t123, the transmission drivers 152B corresponding to the transmission signals OUT0 and OUTn−1 supply the charge to the corresponding output signal lines Wout. As a result, the potential of each of the transmission signals OUT0 and OUTn−1 starts to transition from the intermediate potential to the high level at time t123. In addition, at time t123, the transmission drivers 152B corresponding to the transmission signals OUT1 and OUTn discharge the electricity from the corresponding output signal lines Wout. As a result, the potential of each of the transmission signals OUT1 and OUTn starts to transition from the intermediate potential to the low level at time t123.

At time t124, the charge is supplied from the corresponding transmission drivers 152B, and the potential of each of the transmission signals OUT0 and OUTn−1 reaches the high level. In addition, at time t124, the electricity is discharged from the corresponding transmission drivers 152B, and the potential of each of the transmission signals OUT1 and OUTn reaches the low level.

At time t125, the control circuit 12 shifts the state of the control signals CTUU0, CTUUn−1, CTDD1, and CTDDn from the high state to the low state and outputs the control signals CTUU0, CTUUn−1, CTDD1, and CTDDn to the corresponding short-circuit control elements SWU1 and SWD0 to thereby open both ends of the corresponding short-circuit control elements SWU1 and SWD0.

At time t126 that is a timing at which a predetermined time has passed from time t125, the control circuit 12 shifts the state of the control signals CTUD0, CTUDn−1, CTDU1, and CTDUn from the low state to the high state and outputs the control signals CTUD0, CTUDn−1, CTDU1, and CTDUn to the corresponding short-circuit control elements SWU0 and SWD1 to thereby short-circuit both ends of the corresponding short-circuit control elements SWU0 and SWD1.

As a result, at time t126, the charge is supplied from the output signal lines Wout corresponding to the transmission signals OUT0 and OUTn−1 to the one end of the capacitive element Cext through the short-circuit signal line Wsu, and the charge is supplied from the other end of the capacitive element Cext to the output signal lines Wout corresponding to the transmission signals OUT1 and OUTn through the short-circuit signal line Wsd. As a result, the potential of each of the transmission signals OUT0, OUT1, OUTn−1, and OUTn starts to transition to the intermediate potential.

At time t127, the potential of each of the transmission signals OUT0, OUT1, OUTn−1, and OUTn reaches the intermediate potential. As a result, the current control elements DU0 and DD1 are electrically disconnected at time t127. In addition, at time t127, the transmission drivers 152B corresponding to the transmission signals OUT1 and OUTn supply the charge to the corresponding output signal lines Wout. As a result, the potential of each of the transmission signals OUT1 and OUTn starts to transition from the intermediate potential to the high level at time t127. In addition, at time t127, the transmission drivers 152B corresponding to the transmission signals OUT0 and OUTn−1 discharge the electricity from the corresponding output signal lines Wout. As a result, the potential of each of the transmission signals OUT0 and OUTn−1 starts to transition from the intermediate potential to the low level at time t127.

At time t128, the charge is supplied from the corresponding transmission drivers 152B, and the potential of each of the transmission signals OUT1 and OUTn reaches the high level. In addition, at time t128, the electricity is discharged from the corresponding transmission drivers 152B, and the potential of each of the transmission signals OUT0 and OUTn−1 reaches the low level.

This completes the description of the transition of the potential of each signal in the output circuit 15E. Next, a flow of a series of operations in the output circuit 15E will be described in detail. FIG. 17 is a flow chart illustrating the flow of the series of operations in the output circuit 15E according to the fifth embodiment of the present disclosure.
SP100
The transmission driver 152B amplifies the input signal IN input from the driver selection circuit 151 to a signal with the potential difference that allows transmission of the signal from the linear electrode 22. The transmission driver 152B sets the amplified signal as the transmission signal OUT and transmits the transmission signal OUT to the corresponding output signal line Wout. In addition, the control circuit 12 determines to which one of the short-circuit signal lines Wsu and Wsd each output signal line Wout is to be connected. The process then moves to SP102.
SP102
The control circuit 12 determines whether or not the signal waveform of the transmission signal OUT rises from the low level to the high level at this timing. If the determination is affirmative, the process moves to SP104. On the other hand, if the determination is negative, the process moves to SP108.
SP104
The control circuit 12 controls both ends of each short-circuit control element SWU0 to open when the control circuit 12 determines to connect the corresponding output signal line Wout to the short-circuit signal line Wsu. The control circuit 12 controls both ends of each short-circuit control element SWD0 to open when the control circuit 12 determines to connect the corresponding output signal line Wout to the short-circuit signal line Wsd. The process then moves to SP106.
SP106
The control circuit 12 controls both ends of each short-circuit control element SWU1 to short-circuit when the control circuit 12 determines to connect the corresponding output signal line Wout to the short-circuit signal line Wsu. The control circuit 12 controls both ends of each short-circuit control element SWD1 to short-circuit when the control circuit 12 determines to connect the corresponding output signal line Wout to the short-circuit signal line Wsd. As a result, the potential is supplied from the capacitive element Cext to the output signal lines Wout with the potential in the low level through the short-circuit signal line Wsu or Wsd. The potentials of each output signal line Wout and one of the short-circuit signal lines Wsu or Wsd first transition to the intermediate potential. The potential of each output signal line Wout then transitions from the intermediate potential to the high level.
SP108
The control circuit 12 determines whether or not the signal waveform of the transmission signal OUT falls from the high level to the low level at this timing. If the determination is affirmative, the process moves to SP110. On the other hand, if the determination is negative, the series of operations ends.
SP110
The control circuit 12 controls both ends of each short-circuit control element SWU1 to open when the control circuit 12 determines to connect the corresponding output signal line Wout to the short-circuit signal line Wsu. The control circuit 12 controls both ends of each short-circuit control element SWD1 to open when the control circuit 12 determines to connect the corresponding output signal line Wout to the short-circuit signal line Wsd. The process then moves to SP112.
SP112
The control circuit 12 controls both ends of each short-circuit control element SWU0 to short-circuit when the control circuit 12 determines to connect the corresponding output signal line Wout to the short-circuit signal line Wsu. The control circuit 12 controls both ends of each short-circuit control element SWD0 to short-circuit when the control circuit 12 determines to connect the corresponding output signal line Wout to the short-circuit signal line Wsd. As a result, the potential is supplied from the output signal lines Wout with the potential in the high level to the capacitive element Cext through the short-circuit signal line Wsu or Wsd. The potentials of each output signal line Wout and one of the short-circuit signal lines Wsu and Wsd first transition to the intermediate potential. The potential of each output signal line Wout then transitions from the intermediate potential to the low level.

Effects

As described above, the sensor controller 10 in the present embodiment includes the control circuit 12 that transmits the control signals CTUU, CTUD, CTDU, and CTDD. The intermediate potential supply unit 153E includes the first short-circuit signal line Wsu and the second short-circuit signal line Wsd. The first output control circuit 155D includes the third current control circuit which is electrically connected or electrically disconnected according to the control signal CTUD and in which the one end is connected to the corresponding output signal line Wout and the other end is connected to the first short-circuit signal line Wsu, the third current control circuit being electrically connected only in the direction from the corresponding output signal line Wout to the first short-circuit signal line Wsu, and the fourth current control circuit which is electrically connected or electrically disconnected according to the control signal CTDD and in which the one end is connected to the corresponding output signal line Wout and the other end is connected to the second short-circuit signal line Wsd, the fourth current control circuit being electrically connected only in the direction from the corresponding output signal line Wout to the second short-circuit signal line Wsd. The second output control circuit 156D includes the fifth current control circuit which is electrically connected or electrically disconnected according to the control signal CTUU and in which the one end is connected to the corresponding output signal line Wout and the other end is connected to the second short-circuit signal line Wsd, the fifth current control circuit being electrically connected only in the direction from the second short-circuit signal line Wsd to the corresponding output signal line Wout, and the sixth current control circuit which is electrically connected or electrically disconnected according to the control signal CTDU and in which the one end is connected to the corresponding output signal line Wout and the other end is connected to the first short-circuit signal line Wsu, the sixth current control circuit being electrically connected only in the direction from the first short-circuit signal line Wsu to the corresponding output signal line Wout.

According to this configuration, the output control circuit 155D electrically disconnects the current paths in the directions from the short-circuit signal lines Wsu and Wsd to the corresponding output signal lines Wout at the timing at which the potentials of the short-circuit signal lines Wsu and Wsd exceed the potentials of the corresponding output signal lines Wout. In addition, the output control circuit 156D electrically disconnects the current paths in the directions from the corresponding output signal lines Wout to the short-circuit signal lines Wsu and Wsd at the timing at which the potentials of the corresponding output signal lines Wout exceed the potentials of the short-circuit signal lines Wsu and Wsd. Therefore, according to the present invention, the sensor controller 10 supplies the intermediate potential from the intermediate potential supply unit 153E to the output signal lines Wout only in the necessary period. Therefore, the sensor controller 10 can suppress the through current and reduce the power consumption more than in the conventional configuration.

Modifications

Note that the present invention is not limited to the above embodiments. That is, those skilled in the art can appropriately change the design of the embodiments, and the changed embodiments are also included in the scope of the present invention as long as the changed embodiments have the features of the present invention. In addition, the elements included in the embodiments and modifications described later can be combined if technically possible, and the combinations are also included in the scope of the present invention as long as the combinations have the features of the present invention.

For example, although it is desirable in the embodiments described above that the number of values "0" and the number of values "1" included in the codes for determining the values allocated to the transmission drivers 152 be approximately the same, the ratio of the values "0" to the values "1" included in the codes may be approximately 45:55 or 55:45.

In addition, although one transmission driver 152 is provided for one linear electrode 22 in the above embodiments, one transmission driver 152 may be provided for one linear electrode 21. That is, the transmission driver 152 may amplify the input signal IN input from the driver selection circuit 151 to a signal with the potential difference that allows transmission of the signal from the linear electrode 21. The transmission driver 152 may set the amplified signal as the transmission signal OUT and transmit the transmission signal OUT to the corresponding linear electrode 21 through the output signal line Wout.

In addition, the transmission driver 152B may include the current sources I0 and I1 as in the transmission driver 152C. That is, the transmission driver 152B may include the current source I0 between the source terminal of the transistor TR2 and the power supply line VDD and may include the current source I1 between the source terminal of the transistor TR3 and the reference line GND.

According to this configuration, the transmission driver 152B restricts, to constant current values, the current flowing from the power supply line VDD to the transmission driver 152D and the current flowing from the transmission driver 152D to the reference line GND, to thereby make the transition of the potential of the transmission signal OUT more gradual. This reduces the high frequency components of the transmission driver 152B and improves the EMI characteristics of the transmission driver 152B.

In addition, the transmission driver 152B may include the OR circuit OR, the AND circuit AND, and the delay circuits DL0 and DL1 as with the transmission driver 152D. The circuit configuration and the operation of the transmission driver 152B in this case are similar to those of the transmission driver 152D excluding the transistors TR1 and TR4 and the NOT circuit INV2. Therefore, the circuit configuration and the operation will not be described.

According to this configuration, the supply of the charge from the power supply line VDD to the output signal line Wout performed through the transistor TR2 and the discharge of the electricity from the output signal line Wout to the reference line GND performed through the transistor TR3 are not performed at the same time in the transmission driver 152B. This can suppress the through current and reduce the power consumption.

Further, the transmission driver 152B may include the current sources I0 and I1, the OR circuit OR, the AND circuit AND, and the delay circuits DL0 and DL1 as with the transmission driver 152E. The circuit configuration and the operation of the transmission driver 152B in this case are similar to those of the transmission driver 152E excluding the transistors TR1 and TR4 and the NOT circuit INV2. Therefore, the circuit configuration and the operation will not be described.

According to this configuration, the transmission driver 152B restricts, to constant current values, the current flowing from the power supply line VDD to the transmission driver 152D and the current flowing from the transmission driver 152D to the reference line GND, to thereby make the transition of the potential of the transmission signal OUT more gradual. This reduces the high frequency components of the transmission driver 152B and improves the EMI characteristics of the transmission driver 152B. In addition, the supply of the charge from the power supply line VDD to the output signal line Wout performed through the transistor TR2 and the discharge of the electricity from the output signal line Wout to the reference line GND performed through the transistor TR3 are not performed at the same time in the transmission driver 152B. This can suppress the through current and reduce the power consumption.

In addition, the touch sensor 20 may include a switch element. Further, at least one of the plurality of linear electrodes 22 may detect a press of the switch element of the touch sensor 20.

According to this configuration, it is possible to suppress the through current and reduce the power consumption, even when at least one of the linear electrodes 22 detects a press of the switch of the touch sensor 20.

DESCRIPTION OF REFERENCE SYMBOLS

10: Sensor controller
20: Touch sensor
152: Transmission driver
153: Intermediate potential supply unit

The invention claimed is:

1. A sensor controller connected to a touch sensor including a plurality of detection electrodes arranged in a plane, the sensor controller comprising:

a plurality of transmission drivers that, in operation, generates signal waveforms that transition between a first potential and a second potential higher than the first potential, and outputs the signal waveforms as transmission signals;

a plurality of output signal lines that, in operation, outputs the transmission signals output from corresponding ones of the transmission drivers to corresponding ones of the detection electrodes; and an intermediate potential supply unit including a potential generation circuit that includes a voltage source or a capacitive element separate from the transmission drivers, the intermediate potential supply unit, in operation, outputting a voltage from the potential generation circuit at a first timing at which potentials of the signal waveforms start to transition from the first potential to the second potential or from the second potential to the first potential, and supplying an intermediate potential between the first potential and the second potential to the output signal lines, wherein an output side of the potential generation circuit is connected to two or more of the plurality of output signal lines; and a control circuit that, in operation, transmits a control signal, wherein:

each of the transmission drivers has an output mode in which one of the transmission signals is output, and a stop mode in which a state of output is shifted to a high impedance state, the control circuit, in operation, controls each transmission driver of the transmission drivers to enter the stop mode at the first timing and controls the transmission driver to enter the output mode at a second timing at which a predetermined time has passed from the first timing, the intermediate potential supply unit includes a plurality of short-circuit control elements, a first end and a second end of each of the short-circuit control elements, in operation, are short-circuited together or opened according to the control signal, the first end of each of the short-circuit control elements is connected to a corresponding one of the output signal lines and a corresponding one of the transmission drivers, and the second end of each of the short-circuit control elements is connected to the output side of the potential generation circuit, the control circuit, in operation, controls the short-circuit control elements to short-circuit at the first timing and controls the short-circuit control elements to open at the second timing, the potential generation circuit includes the capacitive element, and the intermediate potential supply unit includes:

a first short-circuit signal line connected to a first end of the capacitive element;

a second short-circuit signal line connected to a second end of the capacitive element;

a plurality of first short-circuit control elements, wherein a first end and a second end of each of the first short-circuit control elements, in operation, are short-circuited together or opened according to the control signal, the first end of each of the first short-circuit control elements is connected to a corresponding one of the output signal lines and the corresponding one of the transmission drivers, and the second end of each of the first short-circuit control elements is connected to the first short-circuit signal line; and a plurality of second short-circuit control elements, wherein a first end and a second end of each of the second short-circuit control elements, in operation, are short-circuited together or opened according to the control signal, the first end of each of the second short-circuit control elements is connected to a corresponding one of the output signal lines and the corresponding one of the transmission drivers, and the second end of each of the second short-circuit control elements is connected to the second short-circuit signal line.

2. The sensor controller according to claim 1, wherein:

the control circuit, in operation, determines, for each output signal line of the output signal lines, one of the first short-circuit signal line or the second short-circuit signal line to which the output signal line is to be connected, controls a corresponding one of the first short-circuit control elements to short-circuit at the first timing and open at the second timing in response to determining to connect the output signal line to the first short-circuit signal line, and controls a corresponding one of the second short-circuit control elements to short-circuit at the first timing and open at the second timing in response to determining to connect the output signal line to the second short-circuit signal line.

3. The sensor controller according to claim 1, wherein:
a potential difference between the first potential and the second potential is equal to or greater than 5 V.

4. The sensor controller according claim 1, wherein:
the touch sensor includes a switch, and
at least one of the detection electrodes, in operation, detects a press of the switch.

\* \* \* \* \*